(12) United States Patent
de Jong et al.

(10) Patent No.: US 11,106,452 B2
(45) Date of Patent: Aug. 31, 2021

(54) INFRASTRUCTURE FOR VALIDATING UPDATES VIA A NETWORK OF IOT-TYPE DEVICES

(71) Applicant: Arm Limited, Cambridge (GB)

(72) Inventors: Irenéus Johannes de Jong, Cambridge (GB); Vasileios Laganakos, Walden (GB); Gary Dale Carpenter, Austin, TX (US); Andrew Neil Sloss, Kirkland, WA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/806,943

(22) Filed: Mar. 2, 2020

(65) Prior Publication Data
US 2021/0240462 A1 Aug. 5, 2021

(30) Foreign Application Priority Data

Feb. 4, 2020 (EP) .................................... 20386009

(51) Int. Cl.
| | |
|---|---|
| *G06F 8/65* | (2018.01) |
| *H04L 29/08* | (2006.01) |
| *H04L 12/24* | (2006.01) |
| *G06F 11/36* | (2006.01) |
| *G06F 8/71* | (2018.01) |
| *G16Y 40/35* | (2020.01) |
| *G16Y 10/75* | (2020.01) |

(52) U.S. Cl.
CPC ............... *G06F 8/65* (2013.01); *G06F 8/71* (2013.01); *G06F 11/368* (2013.01); *H04L 41/082* (2013.01); *H04L 67/34* (2013.01); *G16Y 10/75* (2020.01); *G16Y 40/35* (2020.01)

(58) Field of Classification Search
None
See application file for complete search history.

(56) References Cited

U.S. PATENT DOCUMENTS

| | | | |
|---|---|---|---|
| 8,555,273 B1 * | 10/2013 | Chia ....................... | G06F 8/654 717/173 |
| 9,729,542 B2 * | 8/2017 | Jayanti Venkata ...... | H04L 67/12 |
| 10,534,918 B1 | 1/2020 | Davidi et al. | |
| 2015/0286556 A1 | 10/2015 | Ellis et al. | |
| 2016/0179656 A1 * | 6/2016 | Yang ................... | G06F 11/3668 717/124 |
| 2016/0371074 A1 * | 12/2016 | Vyas ....................... | H04W 4/60 |
| 2017/0322934 A1 * | 11/2017 | Chen ........................ | G06F 8/71 |
| 2018/0018161 A1 * | 1/2018 | Gattu ...................... | G06F 8/656 |
| 2019/0042228 A1 * | 2/2019 | Nolan ..................... | G06F 8/654 |
| 2019/0342154 A1 * | 11/2019 | Nair ...................... | H04L 63/029 |

(Continued)

OTHER PUBLICATIONS

Kolehmainen, "Secure Firmware Updates for IoT: A Survey", 2018, 2018 IEEE Confs on Internet of Things, Green Computing and Communications, Cyber, Physical and Social Computing, Smart Data, Blockchain, Computerand Information Technology, Congress on Cybermatics (Year: 2018).*

(Continued)

*Primary Examiner* — Hossain M Morshed
(74) *Attorney, Agent, or Firm* — Berkeley Law & Technology Group, LLP

(57) ABSTRACT

The present disclosure relates generally to Internet of Things (IoT)-type devices and, more particularly, to infrastructure for validating updates via a network of IoT-type devices.

20 Claims, 11 Drawing Sheets

(56) References Cited

U.S. PATENT DOCUMENTS

2020/0210592 A1* 7/2020 Karas ................... G06F 21/552
2020/0272547 A1* 8/2020 Ahmet ................... H04L 67/12

OTHER PUBLICATIONS

Haraldsson, "Fixing Bugs in Your Sleep: How Genetic Improvement Became an Overnight Success", In Proceedings of GECCO '17 Companion, Berlin, Germany, Jul. 15-19, 2017, DOI: http://dx.doi.org/10.1145/3067695.3082517, 8 pgs.

Notification of the International Search Report and the Written Opinion of the International Searching Authority, or the Declaration, App. No. PCT/EP2021/025041, dated May 3, 2021, 13 Pages.

* cited by examiner

INFRASTRUCTURE FOR VALIDATING UPDATES VIA A NETWORK OF IOT-TYPE DEVICES

BACKGROUND

Field

The present disclosure relates generally to Internet of Things (IoT)-type devices and, more particularly, to infrastructure for validating updates via a network of IoT-type devices.

Information

The Internet is widespread. The World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like.

In some instances, challenges may be faced in maintaining and/or updating IoT-type devices, for example, due at least in part to IoT-type devices being relatively large in number, relatively widely dispersed and/or operated in a relatively wide variety of circumstances. Also, IoT-type devices, for example, may be deployed in relatively remote and/or inaccessible areas with an intent that IoT-type devices operate for relatively longer periods of time (e.g., months, years, decades, etc.). As such, software and/or firmware updates may play a relatively important role over an operating lifetime of an IoT-type device, for example, such as in circumstances wherein manual intervention may be cost prohibitive, difficult, and/or the like. For some electronic devices, such as IoT-type devices (e.g., resource-constrained IoT-type devices), a lack of timely maintenance and/or updates, for example, may endanger associated IoT infrastructure and/or those dependent upon their use, for example.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
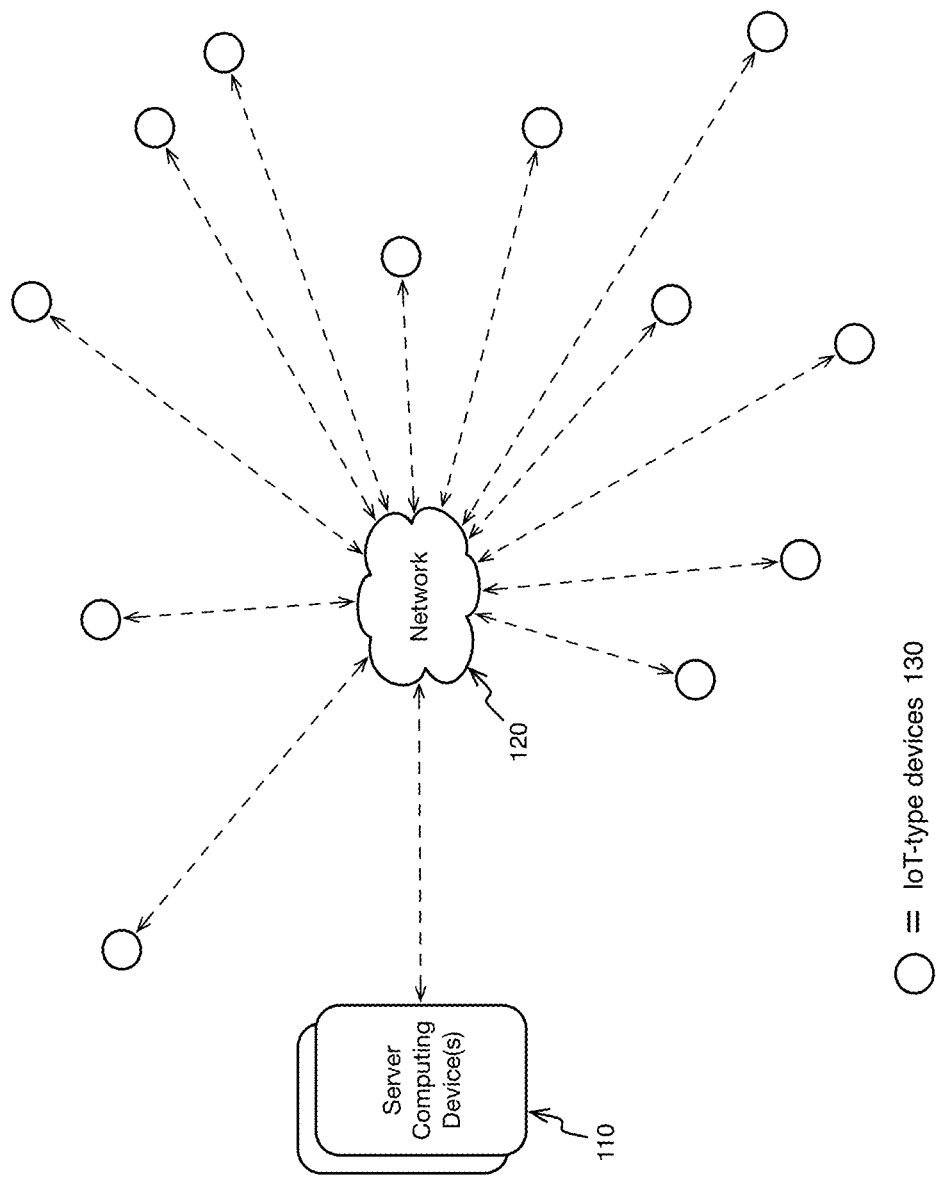
FIG. 1 is a schematic block diagram depicting an embodiment of a system including an example server computing device and example electronic devices.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, the World Wide Web or simply the Web, provided by the Internet, is growing rapidly, at least in part, from the large amount of content being added seemingly on a daily basis. A wide variety of content in the form of stored signals, such as, for example, text files, images, audio files, video files, web pages, measurements of physical phenomena, and/or the like may be continually acquired, identified, located, retrieved, collected, stored, communicated, etc. Increasingly, content is being acquired, collected, communicated, etc. by a number of electronic devices, such as, for example, embedded computing devices leveraging existing Internet and/or like infrastructure as part of a so-called "Internet of Things" (IoT), such as via a variety of protocols, domains, and/or applications. IoT may typically comprise a system of interconnected and/or internetworked physical computing devices capable of being identified, such as uniquely via an assigned Internet Protocol (IP) address, for example. Devices, such as IoT-type devices, for example, may include computing resources embedded into hardware so as to facilitate and/or support a device's ability to acquire, collect, process and/or transmit content over one or more communications networks. In this context, "IoT-type devices" and/or the like refer to one or more electronic and/or computing devices capable of leveraging existing Internet and/or like infrastructure as part of the IoT, such as via a variety of applicable protocols, domains, applications, etc. In particular implementations, IoT-type devices, for example, may comprise a wide variety of embedded devices, such as, for example, automobile sensors, biochip transponders, heart monitoring implants, thermostats, kitchen appliances, locks or like fastening devices, solar panel arrays, home gateways, controllers, and/or the like. Although embodiments described herein may refer to IoT-type devices, claimed subject matter is not limited in scope in these respects. For example, although IoT-type devices may be described, claimed subject matter is intended to include use of any of a wide range of electronic device types, including a wide range of computing device types.

"Electronic content," as the term used herein, should be interpreted broadly and refers to signals, such signal packets, for example, and/or states, such as physical states on a memory device, for example, but otherwise is employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, security parameters, combinations, or the like. Thus, content may be stored and/or transmitted electronically, such as before or after being perceived by human senses. In general, it may be understood that electronic content may be intended to be referenced in a particular discussion, although in the particular context, the term "content" may be employed for ease of discussion. Specific examples of content may include, for example, computer code, metadata, message, text, audio file, video file, data file, web page, or the like. Claimed subject matter is not intended to be limited to these particular examples, of course.

In some instances, challenges may be faced in maintaining and/or updating IoT-type devices, for example, due at least in part to IoT-type devices being relatively large in number, relatively widely diversified with respect to device types and/or characteristics, relatively widely dispersed and/or operated in a relatively wide variety of circumstances. Also, IoT-type devices, for example, may at times be deployed in relatively remote and/or inaccessible areas with an intent that IoT-type devices operate for relatively longer periods of time (e.g., months, years, decades, etc.) with limited and/or no manual intervention. Further, in at least some circumstances, IoT-type devices may be relatively constrained with respect to computing-type resources (e.g., processing and/or storage capabilities). As such, software and/or firmware updates may play a relatively important role over an operating lifetime of an IoT-type device, for example, such as in circumstances wherein manual intervention may be cost prohibitive, difficult, and/or the like. For some electronic devices, such as IoT-type devices (e.g., resource-constrained IoT-type devices), a lack of timely maintenance and/or updates, for example, may endanger associated IoT infrastructure and/or those dependent upon their use, for example. Additionally, in some circumstances, it may be advantageous to improve and/or otherwise alter one or more aspects of IoT-type device operation and/or performance, such as to implement improved and/or new functionality and/or features, for example. In some instances, to address these and/or like challenges and/or opportunities, one or more software and/or firmware improvement approaches, such as, for example, to fix one or more security vulnerabilities, update configuration settings, add new functionality and/or the like, may be implemented. At times, implementing updates may be challenging. For example, deploying and/or testing new versions of particular executable code across larger groups of IoT-type devices having diversified characteristics, for example, may pose challenges with respect to varying behaviors of different devices, compromised devices exhibiting abnormal and/or adversarial behavior, and/or varying criteria, needs and/or requirements across a group of devices, for example. Such challenges may make it difficult at time to find proposed solutions that may work well across a larger group of relatively diversified electronic and/or computing devices, such as IoT-type devices 130.

FIG. 1 is a schematic block diagram depicting an embodiment 100 of an example system including one or more server computing devices, such as server computing devices 110, and one or more electronic devices, such as IoT-type devices 130. In particular implementations, updates to software and/or firmware may be communicated between one or more server computing devices 110 and one or more IoT devices 130 at least in part via one or more signals and/or signal packets representative of content comprising, for example, one or more software and/or firmware components and/or electronic content descriptive of modifications to be performed to software and/or firmware at IoT device(s) 130. In an embodiment, IoT device(s) 130 may communicate with server computing devices 110 via a network, such as network 120. In particular implementations, network 120 may comprise one or more wired and/or wireless communication technologies including example technologies described herein, although claimed subject matter is not limited in scope in these respects.

In this context, "IoT-type devices" refer to one or more electronic and/or computing devices capable of leveraging existing Internet or like infrastructure as part of the so-called "Internet of Things" or IoT, such as via a variety of applicable protocols, domains, applications, etc. As was indicated, the IoT is typically a system of interconnected and/or internetworked physical devices in which computing may be embedded into hardware so as to facilitate and/or support devices' ability to acquire, collect, and/or communicate content over one or more communications networks, for example, at times, without human participation and/or interaction. IoT-type devices 130, for example, may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, and/or the like, to name a few non-limiting examples. Typically, in this context, a "mobile device" refers to an electronic and/or computing device that may from time to time have a position or location that changes, and/or a stationary device refers to a device that may have a position or location that generally does not change. In some instances, IoT-type devices, such as IoT-type devices 130, may be capable of being identified, such as uniquely, via an assigned Internet Protocol (IP) address, as one particular example, and/or having an ability to communicate, such as receive and/or transmit electronic content, for example, over one or more wired and/or wireless communications networks.

In an embodiment, improvements to firmware and/or software may be implemented at least in part via execution of code implementing one or more evolutionary and/or genetic processes for improving software and/or firmware. For example, in an effort to improve one or more aspects and/or characteristics of one or more software and/or firmware components that may be deployed at one or more IoT devices 130, one or more parameters and/or algorithms, for example, may be altered, subtracted and/or added to generate one or more proposed solutions. "Solution," "proposed solution" and/or the like in this context refer to signals and/or states representative of one or more changes to one or more software and/or firmware components and/or to signals and/or states representative of a new version of particular executable code to be executed by one or more IoT devices 130, for example. Herein, "solution," "proposed solution," and/or "new version of particular executable code" and/or the like may be utilized interchangeably.

In an embodiment, proposed solutions (e.g., new versions of particular executable code) may be generated, at least in part, by one or more server computing devices 110, for example. In particular implementations, one or more aspects of proposed solutions may be generated in a random and/or pseudo-random manner. Additionally, proposed solutions may be tested to determine which, if any, may provide improved behavior and/or performance for one or more particular IoT devices 130, for example. In particular implementations, testing may be performed, in whole or in part, at server computing device(s) and/or at one or more IoT devices 130, for example. Further, in a particular implementation, testing operations may result in feedback (e.g., signals and/or signal packets comprising content descriptive of one or more aspects of device operation and/or performance) that may be utilized in generating additional proposed solutions, as described in more detail below.

In an embodiment, deployment of proposed solutions may occur across a relatively larger number of IoT devices 130. Feedback, such as in the form of signals and/or signal packets representative of one or more parameters indicative of one or more aspects of software and/or firmware suitability and/or function and/or of IoT-type device function and/or performance, for example, may be generated and/or gathered at multiple points in time and/or from multiple electronic devices (e.g., server computing devices 110 and/or IoT-type devices 130). In particular implementations, feedback may include one or more parameters indicative of energy consumption, device and/or functional unit operation and/or malfunction, logged exceptions and/or errors, performance parameters, etc., to name but a few non-limiting examples. By combining evolutionary and/or genetic software and/or firmware improvement approaches with feedback generated and/or gathered at multiple points in time and/or from relatively larger numbers of electronic and/or computing devices, such as IoT-type devices 130, automated and/or partially automated improvements to software and/or firmware across relatively larger numbers of relatively diverse IoT-type devices operating in various conditions and/or environments, for example, may be realized.

Although evolutionary and/or genetic processes for improving software and/or firmware are mentioned herein, claimed subject matter is not limited in scope to any particular approaches for automated and/or partially automated improvement of software and/or firmware, such as software and/or firmware that may be deployed at one or more IoT-type devices 130, for example.

Figure 2:
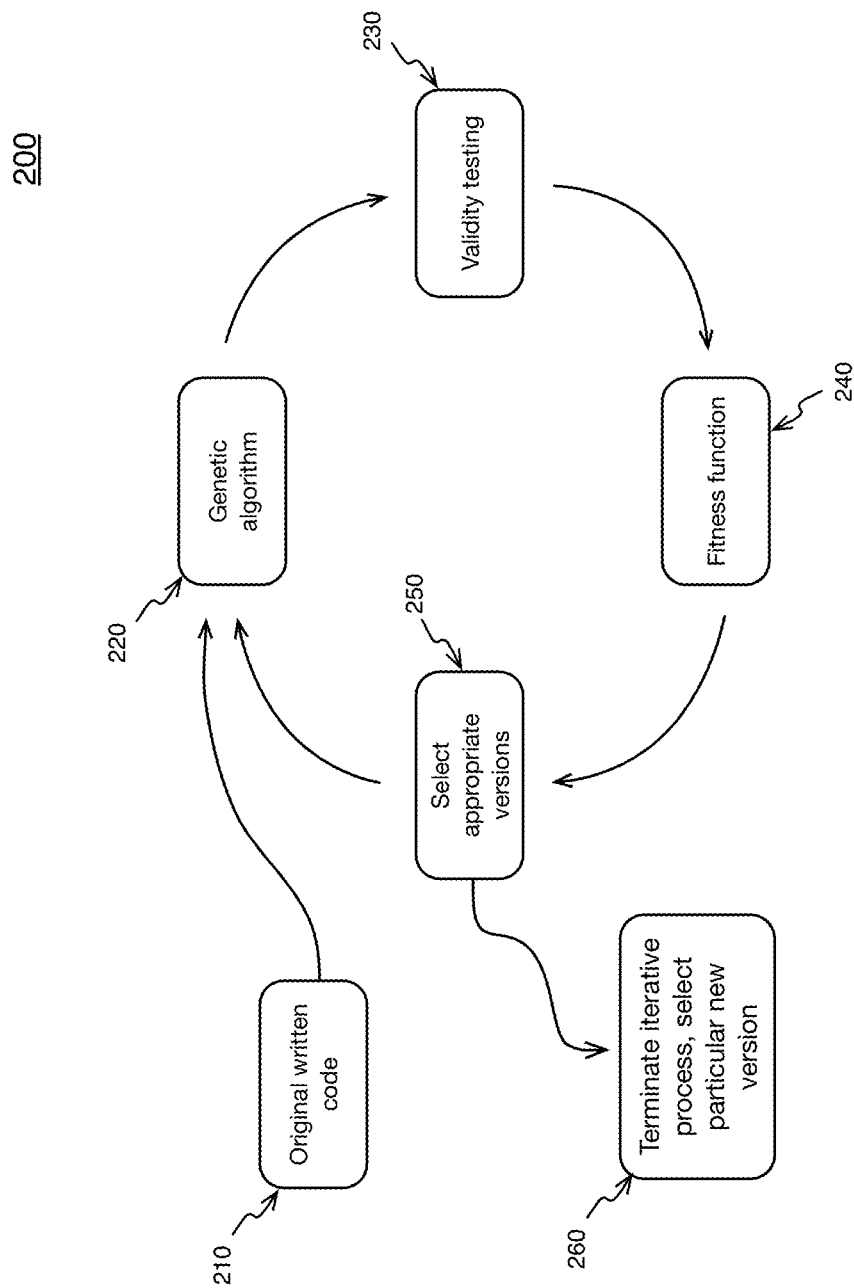
FIG. 2 is an illustration of an example flow diagram depicting an embodiment of a process for improving software and/or firmware deployed at example electronic devices.

FIG. 2 is an illustration of an example simplified flow diagram depicting an embodiment 200 of a process for improving software and/or firmware, such as software and/or firmware that may be deployed, for example, at one or more electronic devices, such as IoT-type devices 130. In particular implementations, approaches for improving software and/or firmware via evolutionary and/or genetic techniques, for example, may comprise an iterative process, depicted, for example, at blocks 210-260 of FIG. 2. Embodiments in accordance with claimed subject matter may include all of blocks 210-260, fewer than blocks 210-260, and/or more than blocks 210-260. Likewise, it should be noted that content acquired or produced, such as, for example, input signals, output signals, operations, results, etc. associated with example embodiment 200 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In some circumstances, at least in part in response to a determination to alter and/or improve one or more aspects of one or more software and/or firmware components, such as original written code depicted at block 210, an evolutionary and/or genetic algorithm, such as may be executed at least in part by one or more server computing devices 110, may generate a number of proposed solutions (e.g., new versions of code) at least in part by mutating executable code and/or values (e.g., altering, adding and/or subtracting one or more executable instructions and/or values), as depicted at block 220. In one or more embodiments, evolutionary and/or genetic approaches for improving software and/or firmware, such as depicted at block 220, may include randomly and/or pseudo-randomly generating one or more aspects of a population of proposed solutions. Typically, in this context, a "generation" refers to a specific step in an evolutionary population, in which individual proposed solutions or simply individuals in a population of proposed solutions undergo change, such as via crossover and/or mutation. Further, in this context, an "evolutionary population" or simply "population" typically refers to a set of individual solutions.

Further, for example, particular implementations may also include testing proposed solutions for validity, as depicted at block 230. In particular implementations, proposed solutions may be tested for validity at least in part by evaluating functionality of a proposed solution against original program behavior and/or via selection and/or application of predefined regression tests, for example. However, claimed subject matter is not limited in scope with respect to particular validity testing techniques, for example. As further indicated at block 240, evaluations of fitness for individual proposed solutions within individual generations may be performed via fitness function or process, in particular implementations. For example, determinations of fitness may be based, at least in part, on a measure of how well a particular proposed solution satisfies one or more specified parameters and/or goals.

In a particular implementation, proposed solutions within a particular generation that have been determined to have relatively higher measures of fitness may be selected from a current population, and/or selected proposed solutions may be individually further mutated and/or otherwise altered to form a generation, as depicted at block 250. A generation of proposed solutions may be used in a subsequent iteration of an evolutionary and/or genetic approach, returning to block 220, for example. As depicted at block 260, in a particular implementation, an iterative process, such as described above in connection with blocks 220-250, may terminate responsive at least in part to a threshold number of generations being reached and/or responsive at least in part to a determination that a specified level of fitness has been achieved for one or more proposed solutions. In a particular implementation, a particular solution may be selected from among remaining proposed solutions. For example, a particular solution with a relatively higher fitness score as compared with other proposed solutions may be selected. In a particular implementation, a selected solution may continue to be deployed at a particular IoT-type device 130 and/or may be further deployed to other and/or relatively larger numbers of IoT-type devices 130, for example.

For the example described above in connection with embodiment 200, an iterative process for improving software and/or firmware may be performed at least in part by server computing device(s) 110. Further, in particular implementations, some testing may be performed on a single IoT-type device 130 and/or at relatively few IoT-type devices 130, in some circumstances. In at least some circumstances, it may be advantageous to deploy and/or test proposed solutions across a larger group of relatively diverse electronic and/or computing devices, such as IoT-type devices 130. Deploying and/or testing proposed solutions across larger groups of relatively diverse IoT-type devices, for example, may pose challenges with respect to varying behaviors of different devices, compromised devices exhibiting abnormal and/or adversarial behavior, and/or varying criteria, needs and/or requirements across a group of devices, for example. Such challenges may make it difficult for particular implementations such as described above in connection with embodiment 200 to find proposed solutions that may work well across a larger group of relatively diverse electronic and/or computing devices, such as IoT-type devices 130.

As discussed below, in one or more embodiments, it may prove beneficial to develop, in an automated and/or semi-automated manner, one or more proposed solutions that may work across a larger portion of a large group of relatively diverse electronic and/or computing devices, such as IoT-type devices 130. Additional development may be focused on situations and/or devices for which an automated and/or semi-automated software and/or firmware improvement approach may not be sufficiently suitable, for example. Such automated and/or semi-automated improvements in software and/or firmware for larger groups of relatively diverse IoT-type devices, for example, may help maintain deployed IoT-type devices over time as conditions evolve, for example.

In one or more embodiments, it may also be advantageous to validate, such as to test software and/or firmware improvements (e.g., proposed solutions) on deployed IoT-type devices 130. However, testing proposed solutions, for example, on deployed IoT-type devices 130 may negatively impact quality of experience for users of deployed IoT-type devices 130 and/or may negatively impact operation and/or behavior of deployed IoT-type devices 130. Therefore, it may be advantageous to have an ability to roll-back proposed solutions to a previous, known-to-work solution. It may further be advantageous to identify a solution's potential negative impact to user experience and/or IoT-type device operation, such as before a solution is able to have such an impact, for example. Example embodiments described herein, for example, are intended to address these challenges, in whole and/or in part, and are also intended to at least help provide the advantages mentioned.

Figure 3:
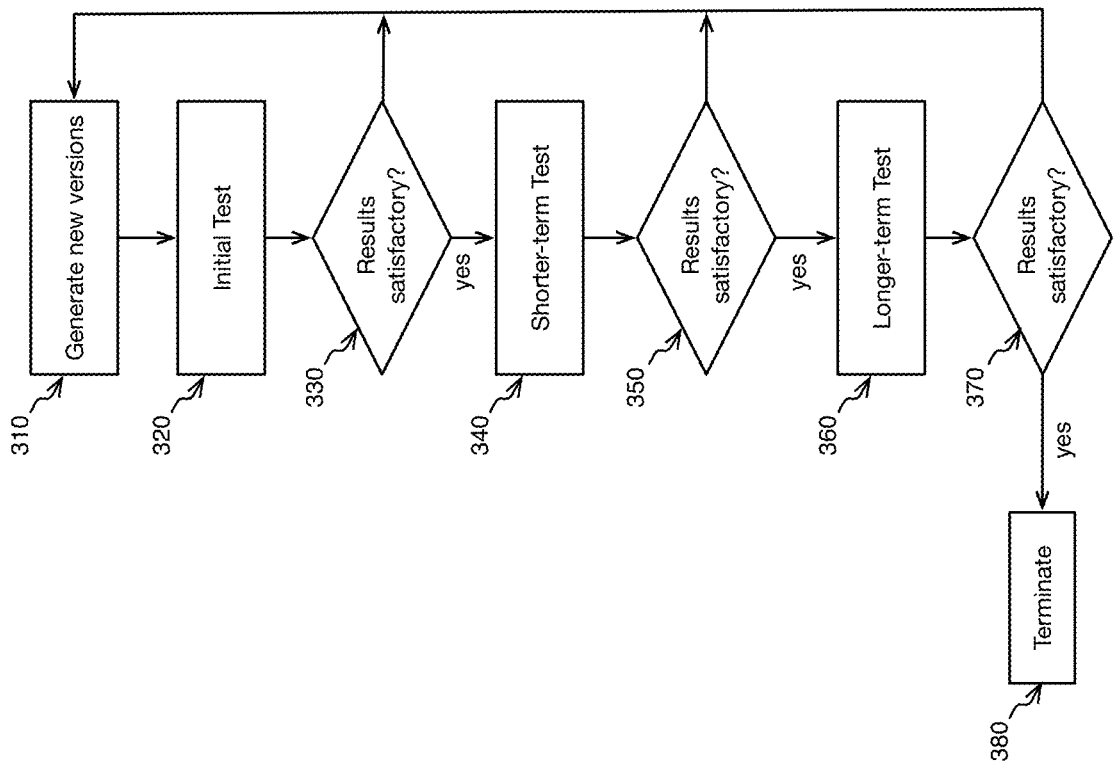
FIG. 3 is an illustration of an example flow diagram depicting an example process for improving software and/or firmware deployed at example electronic devices, in accordance with an embodiment.

FIG. 3 is an illustration of an example flow diagram depicting an embodiment 300 of an example process for improving software and/or firmware. Embodiments in accordance with claimed subject matter may include all of blocks 310-380, fewer than blocks 310-380, and/or more than blocks 310-380. Likewise, it should be noted that content acquired or produced, such as, for example, input signals, output signals, operations, results, etc. associated with example embodiment 300 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As mentioned, improvements to software and/or firmware components, such as software and/or firmware components that may be executed by IoT-type devices 130, for example, may be desirable due at least in part to changes in environment and/or conditions over time, for example. As also mentioned, previous circumstances related to deployment and/or validation of software and/or firmware largely involved single and/or small numbers of electronic devices. In some circumstances, it may be beneficial to generate, deploy, and/or validate improvements to software and/or firmware for relatively larger numbers of electronic devices and/or for relatively more diversified types of electronic devices, including IoT-type devices 130. For example, through improvement and/or validation of proposed solutions across relatively larger and/or more diverse groups of IoT-type devices 130, benefits and/or advantages of evolutionary and/or genetic approaches for improvement of software and/or firmware may be significantly enhanced.

As depicted at block 310, an example process for software and/or firmware improvement may include generating proposed solutions. In a particular implementation, proposed solutions may be generated at least in part in response to a determination to alter and/or improve one or more software and/or firmware components. For example, server computing device(s) 110 may execute an evolutionary and/or genetic algorithm to generate a number of proposed solutions (e.g., new versions of particular executable code) via one or more appropriate techniques, such as at least in part by mutating executable code (e.g., altering, adding and/or subtracting one or more executable instructions and/or values). In a particular implementation, evolutionary and/or genetic algorithms for generating proposed solutions, such as depicted at block 310, may include randomly and/or pseudo-randomly generating a population of proposed solutions. In particular implementations, determinations to initiate software and/or firmware improvement processing may be based, at least in part, on observations by one or more users (e.g., user reports of bugs and/or abnormal device behavior), device malfunctions, logged exceptions exceeding a threshold amount, energy use and/or performance parameters, etc., to list merely a few non-limiting examples. Determinations to initiate software and/or firmware improvement processing may also be based, at least in part, on maintenance schedules, for example. In a particular implementation, signals and/or states representative of performance and/or error parameters, for example, may be gathered from a number of electronic devices, such as IoT-type devices 130, over a period of time. Software and/or firmware improvement processing may be periodically scheduled to address gathered performance and/or error content, for example.

In general, for particular implementations, proposed solutions may be generated and/or proposed solutions may be tested to determine which, if any, may provide improved behavior and/or performance for IoT-type devices 130. For example, at least in part responsive to generation of proposed solutions at block 310, initial testing of proposed solutions may be performed, as indicated at block 320. In a particular implementation, initial testing may include so-called "sanity" testing, such as to determine whether proposed solutions meet specified parameters and/or to determine whether code and/or code segments may no longer be operational, for example. Simply stated, initial testing may be intended to test proposed solutions in a relatively controlled environment prior to rolling out to a larger number of devices to help ensure that proposed solutions do not break anything. For example, initial testing may help to ensure at least minimal functionality of proposed solutions before deployment to IoT-type devices 130. Also, in an implementation, initial testing may help ensure that proposed solutions have potential to improve IoT-type device behavior and/or performance. For example, initial testing may determine whether a proposed solution is sufficiently and/or suitably varied from a previous solution.

In a particular implementation, as part of initial testing, dependencies among various aspects of software and/or firmware to be updated in accordance with a proposed solution may be checked. For example, checks may be made against specified rules sets for one or more software and/or firmware components. In a particular implementation, syntactic correctness may be checked and/or determinations may be made as to whether a change in a particular code component may negatively impact another code component, perhaps across an enterprise computing system or systems and/or across a large number of devices, for example. Initial testing may further detect and/or identify dependencies that may exist among various electronic devices across an enterprise, for example. In particular implementations, proposed solutions may be tested for validity during initial testing at least in part by evaluating functionality of proposed solutions against original and/or previous code behavior and/or via selection and/or application of specified regression tests, for example. However, claimed subject matter is not limited in scope in these respects.

As further depicted at block 330, responsive to initial testing, a determination may be made as to which proposed solutions, if any, may have failed initial testing and/or which proposed solutions, if any, may have passed initial testing, for example. In a particular implementation, proposed solutions that pass initial testing may be deployed to a number of IoT-type devices 130 and/or may remain deployed at particular IoT devices 130 for additional testing.

Also, in a particular implementation, feedback (e.g., content descriptive of initial testing results for one or more proposed solutions) may be provided to a solution generation function, such as indicated at block 310, so that subsequent solution generation operations may be further guided and/or enhanced. In a particular implementation, solution generation, such as depicted at block 310, and/or initial testing, such as depicted at block 320, may be performed at one or more server computing devices, such as server computing device(s) 110.

In one or more embodiments, as may be seen in embodiment 300 and as discussed more fully below, various testing operations and/or feedback generation and/or gathering operations may occur at multiple points of times during an iterative process to improve software and/or firmware. As mentioned, initial testing may occur at block 320 and/or feedback may be communicated to solution generation function 310 at block 330. As further depicted at block 340, additional testing may be performed, in a particular implementation. For example, shorter-term testing may be performed. In a particular implementation, shorter-term testing may include testing particular proposed solutions for relatively short periods of time. Shorter-term testing may also include, for example, defining and/or executing one or more test cases. In a particular implementation, test cases may be designed to test solutions intended to correct previously determined issues, for example. In a particular implementation, shorter-term testing, such as depicted at block 340, may be performed at one or more server computing devices 110 and/or at one or more IoT-type devices 130. Various implementations may partition shorter-term testing between server and IoT-type devices in different ways, for example.

Embodiments in accordance with claimed subject matter may include testing of various sorts over various periods of time that may be generally referred to as "shorter-term" and/or "longer-term." "Shorter-term," therefore, refers to periods of time shorter in duration than "longer-term" periods of time. However, shorter-term periods of time may be defined to include periods of time ranging from fractions of a second to months or longer, depending on particular implementations. Similarly, longer-term periods of time may be defined, depending on particular implementations, to include periods of time ranging from fractions of a second to months or longer.

As depicted at block 350, responsive to shorter-term testing, a determination may be made as to which proposed solutions, if any, may have failed shorter-term testing and/or which proposed solutions, if any, may have passed shorter-term testing, for example. In an implementation, for shorter-term testing, a response variable may be defined (e.g., one or more metrics of goodness) and/or a threshold level for a response variable may be specified. For example, in order for a proposed solution to be considered to have passed shorter-term testing, a threshold level for a response variable may be met and/or exceeded. In an implementation, a threshold level for a response variable may be based at least in part on one or more performance characteristics of a previous solution. Further, in an implementation, whether shorter-term testing is performed at one or more server computing devices 110 and/or at one or more IoT-type devices 130, testing results may be communicated back to one or more server computing devices 110. For example, feedback (e.g., content descriptive of shorter-term testing results for one or more proposed solutions) may be provided to a solution generation function, such as indicated at block 310, so that subsequent solution generation operations may be further guided and/or enhanced, for example. Feedback, for particular implementations, may relate generally to whether particular proposed solutions being tested are improvements over previous proposed solutions, for example.

In a particular implementation, proposed solutions that pass shorter-term testing may be deployed to a number of IoT-type devices 130 and/or may continue to remain deployed for longer-term testing, as indicated at block 360. Longer-term testing may include tracking IoT-type device behavior over a longer-term period of time in order to evaluate effectiveness of particular proposed solutions. For example, longer-term testing may include so-called "real world" usage testing. Feedback (e.g., content descriptive of longer-term testing results for one or more proposed solutions) may be provided to a solution generation function, such as indicated at block 310, so that subsequent solution generation operations may be further guided and/or enhanced. In particular implementations, shorter-term testing, such as indicated at block 340, may be applied to a relatively larger number of proposed solutions deployed at a number of IoT-type devices 130 and/or longer term testing, such as indicated at block 360, may be applied to relatively fewer proposed solutions deployed at a number of IoT-type devices 130. In one or more embodiments, multiple levels of testing and/or multiple levels of feedback collection across a relatively larger group of IoT-type devices may enhance evolutionary and/or genetic software and/or firmware improvement approaches and/or may at least help address challenges encountered in maintaining relatively larger numbers of deployed electronic devices, such as IoT-type devices 130.

As depicted at block 370, for example, a determination may be made as to which proposed solutions, if any, may have failed longer-term testing and/or which proposed solutions, if any, may have passed longer-term testing, for example. Similar in some respects to shorter-term testing, a threshold level for a response variable may be specified, wherein the threshold level may be met or exceeded in order for a particular proposed solution to be considered to have passed longer-term testing. Also, in a particular implementation, feedback may be provided to a solution generation function, such as indicated at block 310, so that subsequent solution generation operations may be further guided and/or enhanced, for example. As mentioned, feedback, for particular implementations, may relate generally to whether particular proposed solutions being tested are improvements over previous proposed solutions, for example. Further, in a particular implementation, as depicted at block 380, an example process may terminate at least in part in response to a determination, such as at block 370, that longer-term testing of at least one proposed solution is at least satisfactory according to particular specified criteria, for example.

Figure 4:
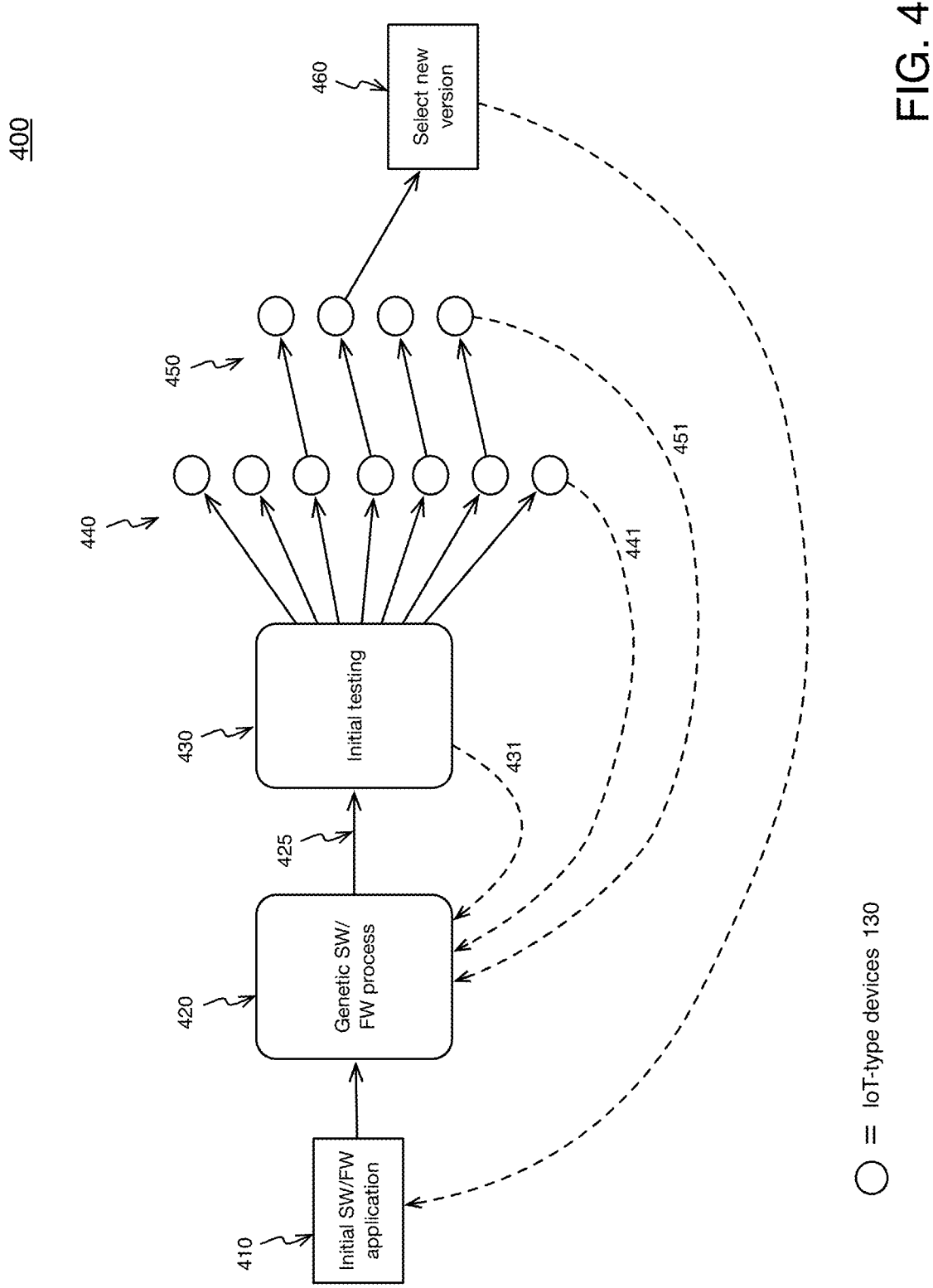
FIG. 4 is an illustration of an example block diagram depicting an embodiment for improving software and/or firmware deployed at example electronic devices.

FIG. 4 is an illustration of an example simplified block diagram depicting an embodiment 400 for improving software and/or firmware deployed at example electronic devices, such as IoT-type devices 130. In particular implementations, functional units to process signals and/or states to perform operations described herein may be performed in software, firmware and/or hardware, or any combination thereof. Further, in particular implementations, functional units may be implemented at one or more electronic devices, such as one or more server computing devices 110 and/or one or more IoT-type devices 130, or any combination thereof. For example, in a particular implementation, a server computing device, such as server computing device 110, may execute an evolutionary and/or genetic software and/or firmware improvement process, as depicted at 420, in an effort to improve an initial software and/or firmware application 410. In a particular implementation, to generate a population of proposed solutions, server computing device 110 may execute one or more executable instructions comprising evolutionary and/or genetic software and/or firmware improvement process 420. Further, in a particular implementation, in circumstances in which previous iterations of an evolutionary and/or genetic process for improving software and/or firmware may have been previously performed and/or in which previous populations of proposed solutions may be been deployed to a number of IoT-type devices 130, feedback from one or more levels of testing may be obtained at evolutionary and/or genetic software and/or firmware improvement process 420 executed, for example, at server computing device(s) 110. For example, signals and/or signal packets 431, 441 and/or 451 representative of one or more parameters descriptive of one or more aspects related to initial testing results, shorter-term testing results and/or longer-term testing results may be obtained at server computing device(s) 110 from functions executed at server computing device(s) 110 and/or from one or more IoT-type devices 130, in particular implementations.

In general, for particular implementations, embodiment 400 may include various levels of testing for proposed solutions, and/or may further include sequential reductions in proposed solutions to be deployed at IoT-type devices 130 in response to various levels of testing. For example, initial testing may be performed on a population 425 of proposed solutions, as depicted at 430. In a particular implementation, a number of proposed solutions within a particular generation may be determined to have relatively higher measures of suitability (e.g., as measured via initial testing) and/or may otherwise be selected from a current population for deployment to a relatively larger number of IoT-type devices, as depicted at 440. At 440, for example, relatively shorter-term testing may be performed at a relatively larger number of IoT-type devices 130, and/or feedback 441 may be provided to evolutionary and/or genetic software and/or firmware improvement process 420 executed at server computing device(s) 110, for example. As mentioned, determinations as to which proposed solutions may be considered to have passed shorter-term testing, and therefore selected for longer-term testing, may be based at least in part on whether a response variable (e.g., one or more metrics measuring one or more aspects related to performance and/or behavior for particular solutions) has met or exceeded a specified threshold value, for example. For example, a particular metric may represent a measure of power usage. In an implementation, power usage may be measured during shorter-term testing of a proposed solution and/or a projection of power usage for longer-term operation of the particular proposed solution may be determined. In a particular implementation, responsive to a projected power usage exceeding a specified threshold level for a proposed solution, the proposed solution may be discarded. Further, responsive at least in part to a projected power usage not exceeding a specified threshold level for a proposed solution, the proposed solution may be deployed for longer-term testing. Of course, claimed subject matter is not limited in scope to the particular examples described herein.

As further depicted at 450, a subset of proposed solutions to have undergone shorter-term testing at 440 may be selected for further and/or continued deployment at a number of IoT-type devices 130, in a particular implementation.

Further, in a particular implementation, a subset of proposed solutions deployed to IoT-type devices at 450 may undergo longer-term testing. In an implementation, longer-term testing may be directed at determining whether a particular proposed solution is an improvement over a previous version. In an implementation, a response value for longer-term testing may be specified at least in part in terms of how close to optimal a particular solution may be for one or more particular criteria. For example, criteria may be specified with respect to power usage and/or performance. A response value indicating improvements in both power usage and performance for a particular proposed solution may be preferable, in an implementation. However, improvement in one of power usage or performance and a worsening of the other may also be considered an improvement over a previous proposed solutions, for example. During longer-term testing involving a relatively large number of relatively diverse IoT-type devices 130, for example, response values for various criteria may be observed for various types of devices operating in various environments and/or in a variety of conditions.

In a particular implementation, feedback 451, generated as a result of longer-term testing, for example, may be provided to evolutionary and/or genetic software and/or firmware improvement process 420. Further, as depicted at block 460, a particular software and/or firmware solution 460 may be selected from among proposed solutions to undergo longer-term testing at 450. In a particular implementation, a selected particular solution 460 may be utilized as a starting point for additional iterations of embodiment 400 and/or may be selected for further deployment to IoT-type devices 130, for example. In an implementation, particular proposed solutions may work well for some IoT-type devices 130, for example, while evolutionary and/or genetic software and/or firmware improvement process 420 may continue to develop improved solutions for other IoT-type devices 130. In this manner, for example, particular solutions may be generated for general use by larger numbers of IoT-type devices and/or different particular solutions may be generated for particular IoT-type devices depending, at least in part, on particular circumstances.

As indicated, for particular implementations, a population of proposed solutions may undergo initial testing, for example. Also, for example, a reduced population of proposed solutions may be selected for shorter-term testing. Further, for particular implementations, a further reduced population of proposed solutions may be selected for longer-term testing. Thus, in particular implementations, numbers of proposed solutions may be reduced from a particular level of testing to another level of testing. Amounts of IoT-type devices involved in shorter-term and/or longer-term testing, for example, may vary, depending on particular implementations. As mentioned, multiple levels of testing and/or multiple levels of feedback collection across a relatively larger group of relatively diversified IoT-type devices may enhance evolutionary and/or genetic software and/or firmware improvement approaches and/or may help address challenges encountered in maintaining relatively larger numbers of relatively diversified deployed electronic devices, such as IoT-type devices 130, for example.

Figure 5:
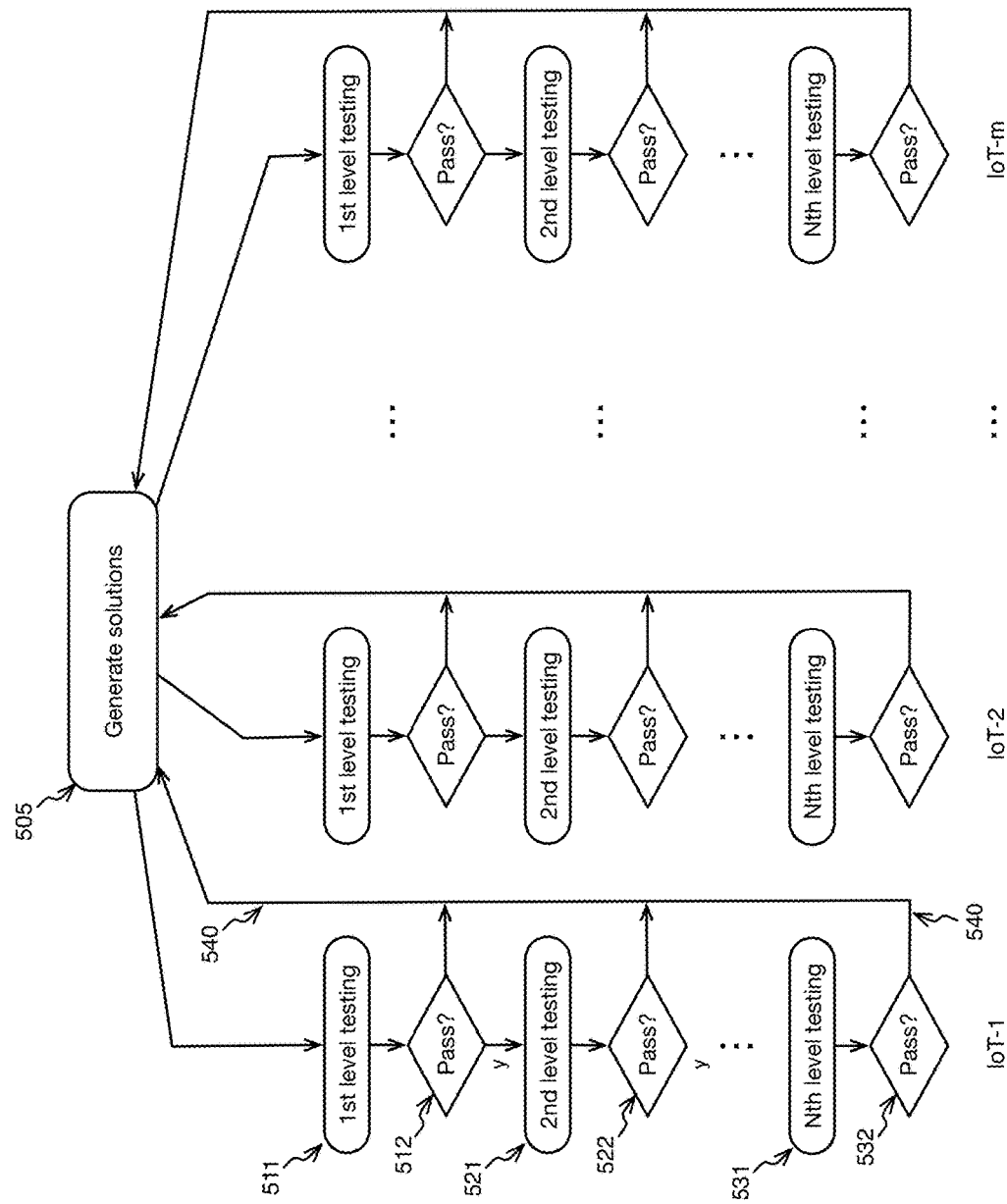
FIG. 5 is an illustration of an example flow diagram depicting an example process for improving software and/or firmware deployed at example electronic devices, in accordance with an embodiment.

FIG. 5 is an illustration of an example flow diagram depicting an embodiment 500 of an example process for improving software and/or firmware deployed at example electronic devices, such as IoT-type devices 130. It should be noted that content acquired or produced, such as, for example, input signals, output signals, operations, results, etc. associated with example embodiment 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In general, example embodiment 500 may include an iterative process for evolutionary and/or genetic improvement of software and/or firmware to be deployed at IoT-type devices 130, for example. In a particular implementation, various levels of testing, such as levels 511, 521 and/or 531, may be performed at a number "m" of IoT-type devices IoT-1, IoT-2, . . . , IoT-m. For example, for IoT-type device IoT-1, a proposed solution may be generated, as depicted at block 505. $1^{st}$ level testing may be performed at block 511, for example. Further, in a particular implementation, a determination may be made, as depicted at block 512, as to whether a proposed solution has passed $1^{st}$ level testing. At least in part in response to a determination that a proposed solution has passed $1^{st}$ level testing, $2^{nd}$ level testing may be performed, as indicated at block 521, for example. Further, feedback 540 may be generated responsive to various levels of testing, such as $1^{st}$ and/or $2^{nd}$ level testing, for example. Additional levels of testing may be performed, depending on particular implementations and/or on particular circumstances.

In particular implementations, individual proposed solutions of a population of proposed solutions may be deployed at one or more electronic devices, such as IoT-type devices 130, for one or more levels of testing and/or feedback generations and/or acquisition. In this manner, for example, a relatively larger number of proposed solutions may be tested at a relatively larger number of IoT-type devices. For each level of testing, a number of proposed solutions may be reduced responsive, at least in part, to testing results, for example. In particular implementations, a number of proposed solutions to pass an nth level of testing, for example, may be relatively few. In some cases, a single proposed solution may be selected for deployment to larger amounts of IoT-type devices, for example, based, at least in part, on testing results. Further iterations of proposed solution generation and/or of multiple levels of testing may be performed to further improve software and/or firmware to be deployed to IoT-type devices, in particular implementations. Again, as mentioned, for particular implementations, multiple levels of testing and/or multiple levels of feedback collection performed across a relatively larger group of electronic devices, such as IoT-type devices 130, may enhance evolutionary and/or genetic software and/or firmware improvement approaches and/or may help address challenges encountered in maintaining relatively larger numbers of deployed IoT-type devices 130.

In particular implementations, testing functions, such as depicted at 511, 521 and/or 531, for example, may be partitioned among one or more server computing devices 110 and/or one or more IoT-type devices 130. Particular levels of testing, such as $1^{st}$ level testing 511, may be performed in whole or in part at one or more server computing devices 110, while other levels of testing, such as $2^{nd}$ level testing 521, for example, may be partitioned among server computing device(s) 110 and/or one or more IoT-type devices 130, for example. In particular implementations, one or more levels of testing, such as $2^{nd}$ level testing 521 and/or nth level testing 531, for example, may be performed at one or more IoT-type devices 130, for example. Further, in particular implementations, testing functions, such as depicted at 511, 521 and/or 531, for example, may include initial and/or sanity-type testing, such as described above, for example, and/or may further include shorter-term and/or longer-term type testing, as also described above.

Figure 6:
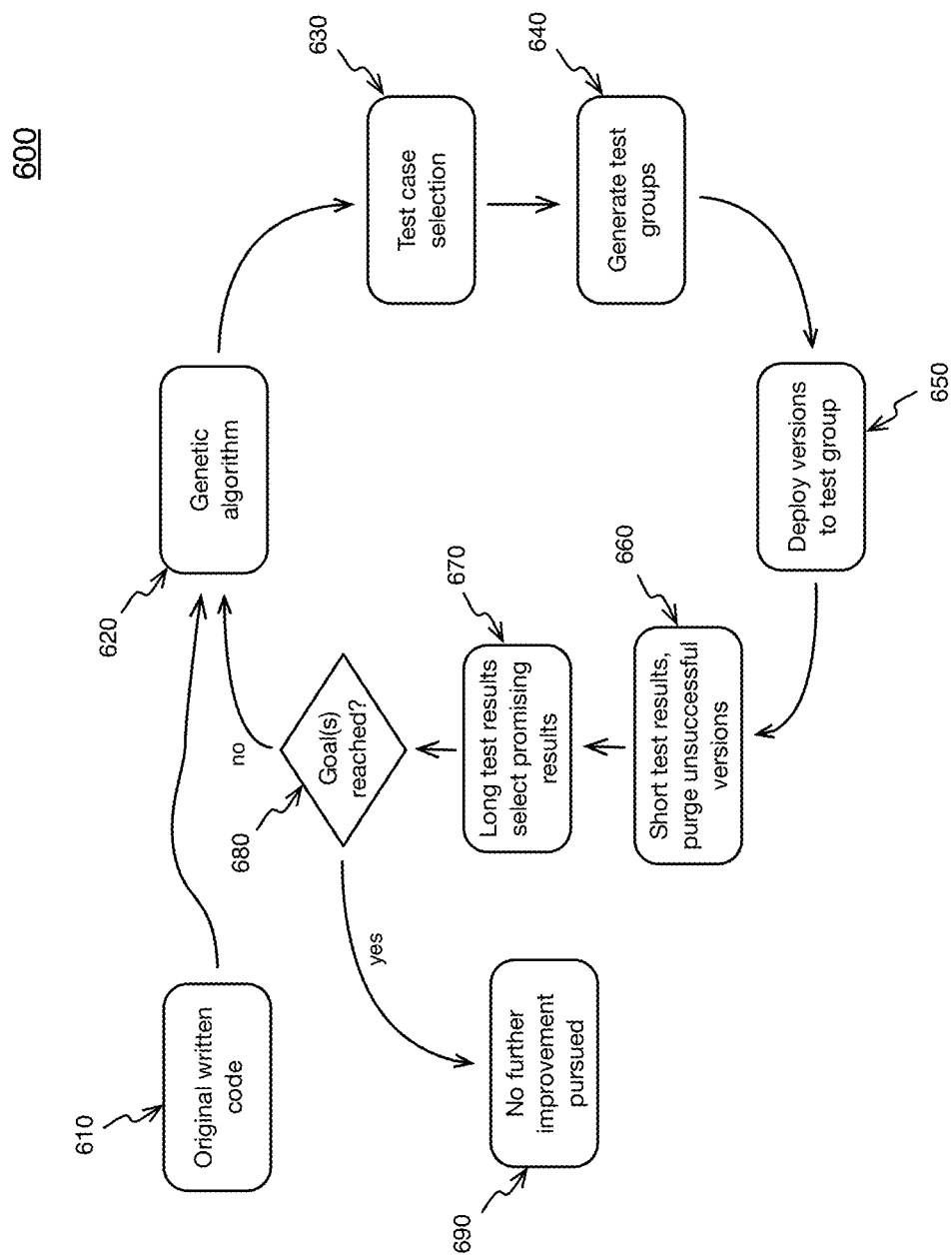
FIG. 6 is an illustration of an example flow diagram depicting an embodiment of a process for improving software and/or firmware deployed at example electronic devices.

FIG. 6 is an illustration of an example flow diagram depicting an embodiment 600 of a process for improving software and/or firmware, such as may be deployed, for example, at one or more electronic devices, such as IoT-type devices 130 of FIG. 1. In one or more embodiments, processes for improving software and/or firmware via evolutionary and/or genetic techniques may comprise an iterative process, depicted, for example, at blocks 610-690 of FIG. 6. Embodiments in accordance with claimed subject matter may include all of blocks 610-690, fewer than blocks 610-690, and/or more than blocks 610-690. Likewise, it should be noted that content acquired or produced, such as, for example, input signals, output signals, operations, results, etc. associated with example embodiment 600 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In a particular implementation, operations depicted at least in part at blocks 610-690 may performed, in whole or in part, at one or more server computing devices 110. For example, in a particular implementation, at least in part in response to a determination to alter and/or improve one or more software and/or firmware components, such as original written code depicted at block 610, an evolutionary and/or genetic process depicted at block 620 may be executed at least in part by one or more server computing devices 110, for example, to generate a population of proposed solutions. In particular implementations, proposed solutions may be generated at least in part by altering, adding and/or subtracting one or more executable instructions and/or values, for example. As mentioned, proposed solutions may be generated randomly and/or pseudo-randomly, at least in part, for particular implementations.

In a particular implementation, at least in part responsive to generation of proposed solutions at block 620, initial testing of proposed solutions may be performed at server computing device(s) 110. In a particular implementation, initial testing may include sanity testing to determine whether proposed solutions meet specified parameters and/or to determine whether code and/or code segments are no longer operational, for example. For example, initial testing may ensure at least minimal functionality of proposed solutions before deployment. Of course, claimed subject matter is not limited in scope to any particular testing techniques.

Further, particular implementations may also include one or more processes for selecting and/or otherwise specifying one or more test cases for shorter-term testing, as depicted, for example, at block 630. In a particular implementation, one or more test cases may be selected and/or specified to test, at least in part, proposed solutions intended to correct previously determined issues, for example. Also, for example, test cases may be selected and/or otherwise specified to check proposed solutions, at least in part, for validity by evaluating functionality against original program behavior and/or via selection and/or application of specified regression tests, for example. Test cases may also include testing a proposed solution for a limited amount of time and/or executing particular code blocks, for example. As further indicated at block 640, test groups may be generated by one or more server computing devices 110, for example. In a particular implementation, one or more sets of IoT-type devices 130 may be selected by server computing device(s) 110 to perform one or more respective test cases, for example. Further, as indicated at block 650, proposed solutions may be deployed by server computing device(s) 110 to selected groups of IoT-type devices 130, for a particular implementation. Also, for a particular implementation, individual test cases may be evaluated across a number of IoT-type devices 130, for example. Further, in a particular implementation, server computing device(s) 110 may track which IoT-type device(s) 130 execute which particular test case.

In particular implementations, results of test case and/or shorter-term testing may be evaluated at server computing device(s) 110, as depicted at block 660. For example, results of test case and/or shorter-term testing may be evaluated to determine measures of suitability for individual proposed solutions within various test groups. In particular implementations, determinations of suitability may be based, at least in part, on a measure of how well a particular proposed solution satisfies one or more specified parameters and/or goals as defined, for example, by selected and/or otherwise specified test cases. As further indicated at block 660, proposed solutions that are evaluated by server computing device(s) 110 to have insufficient measures of fitness may be purged and/or otherwise deselected for further testing. Proposed solutions determined to have sufficient measures of suitability based at least in part on test case results, for example, may be deployed and/or may remain deployed at respective IoT-type devices 130 for longer-term testing, in a particular implementation.

As depicted at block 670, in a particular implementation, longer-term testing may be performed at selected IoT-type devices 130. Further, for example, one or more proposed solutions may be selected by server computing device(s) 110 from among those having undergone longer-term testing based at least in part on longer-term testing results (e.g., feedback comprising signals and/or signal packets representative of one or more parameters indicative of one or more aspects of software and/or firmware function and/or of IoT-type device function) obtained from selected IoT-type devices 130. In a particular implementation, one or more proposed solutions may be selected based at least in part on relative measures of suitability determined through longer-term testing, for example.

As further indicated at block 680, for one or more selected proposed solutions, a determination may be made by server computing device(s) 110, for example, as to whether one or more specified goals have been reached with respect to software and/or firmware improvement, in a particular implementation. In a particular implementation, one or more goals may be specified to include, for example, one or more particular threshold response values (e.g., measures of fitness) and/or a particular threshold number of generations of proposed solutions to be generated and/or tested. For example, a determination as to whether one or more specified goals have been reached may include comparing one or more response values (e.g., measures of fitness) for one or more selected proposed solutions against a specified threshold. Also, for example, such a determination may include determining whether a specified threshold number of generations of proposed solutions have been tested. In a particular implementation, at least in part in response to a determination that one or more specified goals have not been reached, one or more selected proposed solutions may be individually further mutated and/or otherwise altered to form a new generation of proposed solutions, returning to block 620, for example.

As further depicted at block 690, in a particular implementation, an iterative process, such as described above in connection with blocks 620-680, may terminate responsive at least in part to one or more specified goals being achieved, signifying, perhaps, that no further software and/or firmware improvement is to be pursued at present. Of course, subsequent processes for software and/or firmware improvement may be initiated depending, at least in part, on subsequent conditions and/or situations, for example. In a particular implementation, a particular solution may be selected by server computing device(s) 110, for example, to remain deployed at one or more particular IoT-type devices 130 and/or to be deployed to a larger number of IoT-type devices 130. Further, in an implementation, an iterative process, such as described in connection with blocks 620-680, may terminate responsive at least in part to a determination that a specified threshold number of generations of proposed solutions have been tested and/or have failed to bring a response value closer to a specified goal as compared with a staring value.

Figure 7:
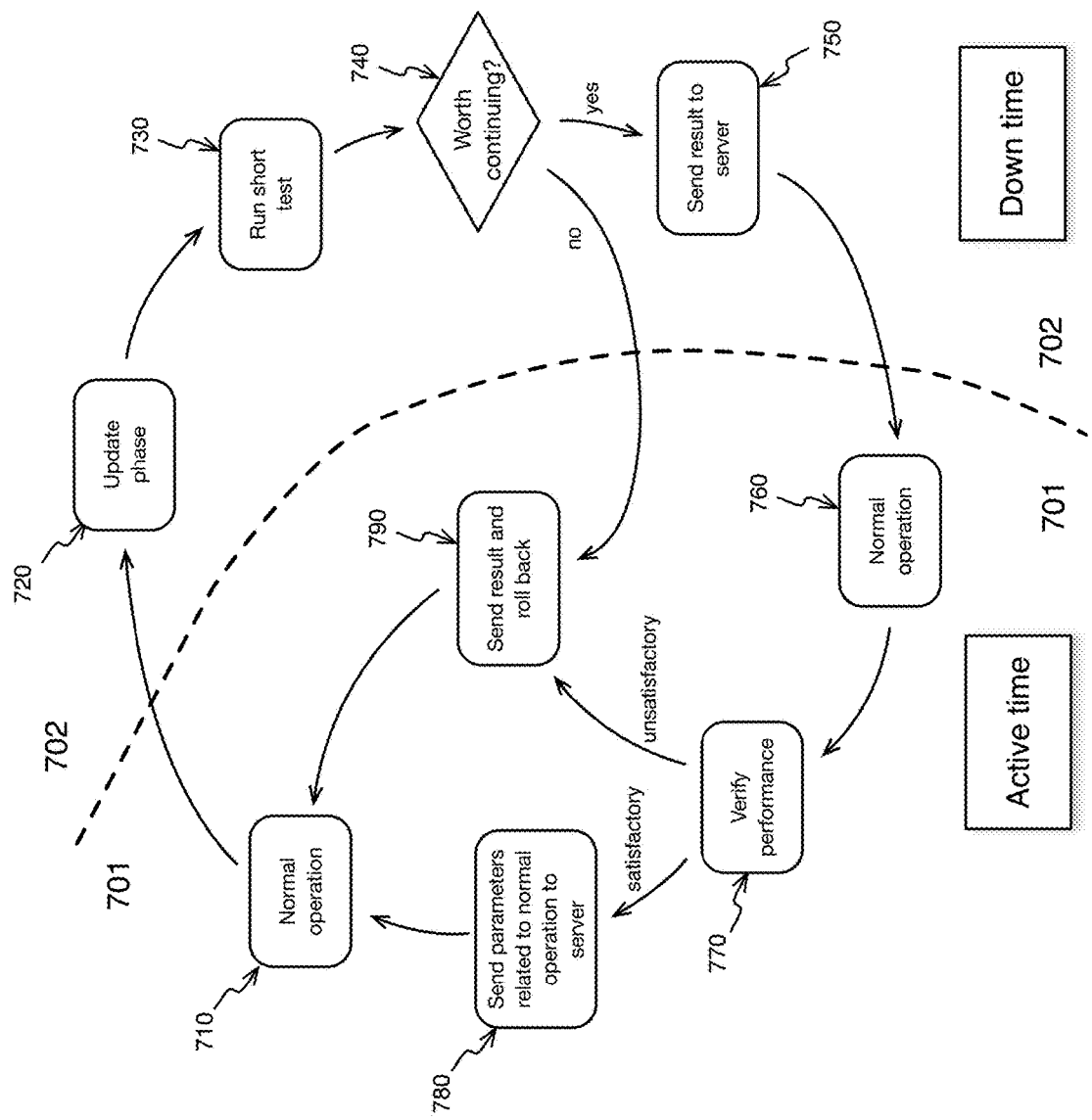
FIG. 7 is an illustration of an example flow diagram depicting an example process for improving software and/or firmware deployed at example electronic devices, in accordance with an embodiment.

FIG. 7 is an illustration of an example flow diagram depicting an embodiment 700 of an example process for improving software and/or firmware deployed at example electronic devices, such as IoT-type devices 130, for example. In a particular implementation, a process for improving software and/or firmware via evolutionary and/or genetic techniques, for example, may comprise an iterative process, such as depicted, for example, at blocks 710-790 of FIG. 7. Embodiments in accordance with claimed subject matter may include all of blocks 710-790, fewer than blocks 710-790, and/or more than blocks 710-790. Likewise, it should be noted that content acquired or produced, such as, for example, input signals, output signals, operations, results, etc. associated with example embodiment 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features. In a particular embodiment, operations depicted at blocks 710-790 may be performed, in whole or in part, by one or more electronic devices, such as IoT-type devices 130. In a particular implementation, a relatively large number of IoT-type devices may be involved in performing processes to improve software and/or firmware.

In particular implementations, IoT-type devices 130 may operate in alternating periods of "active time" and/or "down time" for particular software agents executed at IoT-type devices 130. Active time and down time periods are depicted in FIG. 7 as regions 701 and 702, respectively. "Active time," as utilized herein, refers to periods of time during which a particular software and/or firmware agent updated with a current proposed solution is executed as part of normal operation. Further, as utilized herein, "down time" refers to periods of time during which a particular software and/or firmware agent may be updated with a new proposed solution. Thus, for example, operations depicted by blocks 710, 760, 770, 780 and/or 790 may be performed, in whole or in part, at one or more IoT-type devices 130 during active time periods 701. Similarly, for example, operations depicted at blocks 720, 730, 740 and/or 750 may be performed, in whole or in part, at one or more IoT-type devices 130 during down time periods 702.

For example, during a period of active time 701, an IoT-type device 130 may execute a particular software and/or firmware agent as part of normal operation, as depicted at block 710. During a subsequent period of down time 702, an update phase 720 may occur. For example, during update phase 720, a particular software and/or firmware agent may be updated and/or otherwise altered at IoT-type device 130 in accordance with a particular proposed solution obtained from server computing device(s) 110. Further, for example, shorter-term testing may be performed on a software and/or firmware agent updated with a current proposed solution, as depicted at block 730.

Based at least in part on results of shorter-term testing performed at block 730, a determination may be made as to whether operation of a current proposed solution may be worth continuing. Such as determination may be made, for example, based at least in part on one or more measures of suitability, such as discussed above, in a particular implementation. Further, in a particular implementation, results of a determination made at block 740, for example, may be communicated between IoT-type device 130 and server computing device(s) 110, as depicted at block 750 at least in part in response to a determination that a current proposed solution is worth continuing. As mentioned, for a particular implementation, operations depicted at blocks 720-750 may be performed at an IoT-type device 130 during periods of down time 702.

As further depicted in FIG. 7, for a particular implementation, results (e.g., signals and/or signal packets) of a determination made at block 740, for example, may be communicated between IoT-type device 130 and server computing device(s) 110 as depicted at block 790 at least in part in response to a determination that a current proposed solution is not worth continuing. See previous discussions for examples related to testing of proposed solutions. As further depicted at block 790, for example, a current proposed solution may be rolled-back to a previous version of a particular software and/or firmware agent. Subsequently, normal operation may resume as depicted at block 710, in a particular implementation. Further, in a particular implementation, communication of testing results and/or software and/or firmware version rollback may be performed by IoT-type device 130, in whole or in part, for example, during a period of active time 701, as illustrated in FIG. 7.

At least in part in response to a determination at block 740 that a current proposed solution is worth continuing and/or at least in part in response to testing results being communicated to server computing device(s) 110, normal operation including a current proposed solution may commence as indicated at block 760, in a particular implementation. In a particular implementation, normal operation may include subsequent and/or longer-term testing of a particular software and/or firmware agent updated with a current proposed solution at IoT-type device 130. In a particular implementation, subsequent and/or longer-term testing may including verifying one or more aspects of IoT-type device 130 performance related at least in part to executing a particular software and/or firmware agent updated with a current proposed solution.

In a particular implementation, an unsatisfactory verification of performance of a particular software and/or firmware agent updated with a current proposed solution may trigger communication of longer-term testing results between IoT-type device 130 and server computing device(s) 110 as depicted, for example, at block 790. Further, as also depicted at block 790, at least in part in response to an unsatisfactory verification of a particular software and/or firmware agent updated with a current proposed solution, the particular software and/or firmware agent may be rolled-back to a previous version. Subsequently, normal operation may resume as depicted at block 710.

Further, in a particular implementation, a satisfactory verification of performance of a particular software and/or firmware agent updated with a current proposed solution, such as depicted at block 770, may result in one or more parameters representative of one or more characteristics of IoT-type device 130 performance being communicated between IoT-type device 130 and server computing device(s) 130, as depicted at block 780, for example. Further, normal operation may continue, as depicted at block 710, for example. As mentioned, evolutionary and/or genetic processes for improving software and/or firmware may include iterative operations including generation of new proposed solutions based at least in part on previous testing and/or also on one or more levels of additional testing of new proposed solutions, including, for example, shorter-term and/or longer-term testing performed, in whole or in part, at one or more IoT-type device(s) 130.

In particular implementations, shorter-term and/or longer term testing results (e.g., feedback including signals and/or signal packets representative of content descriptive of one or more aspects of device operation and/or performance) may be obtained from one or more IoT-type devices 130 at server computing device(s) 110. Testing results may be analyzed at server computing device(s) 110, for example, to determine and/or otherwise define promising branches to select for subsequent iterations of an evolutionary and/or genetic process to improve software and/or firmware. Analysis may further be performed based, at least in part, on outliers discerned from testing results obtained from particular IoT-type devices 130. For example, additional software and/or firmware development efforts may be performed to address issues and/or circumstances not sufficiently addressed via automated improvement processes. Also, in a particular implementation, server computing device(s) may track results reporting from IoT-type devices 130 to determine whether one or more IoT-type devices 130 have failed to report for a specified period of time. For example, failure of a particular IoT-type device 130 to report testing results may result in a determination that the particular IoT-type device 130 is compromised and/or defective, perhaps due at least in part to execution of a software and/or firmware agent updated in accordance with a particular proposed solution. In a particular implementation, server computing device(s) 110 may utilize indications of compromised and/or defective IoT-type devices to steer subsequent operations to generate new proposed solutions as part of an iterative process to improve software and/or firmware via evolutionary and/or genetic techniques, for example. Also, for example, at least in part responsive to an indication of a compromised and/or defective IoT-type device 130, further investigation may be performed with respect to the compromised and/or defective IoT-type device 130.

In particular implementations, an IoT-type device 130 may employ one or more timers and/or counters to track one or more aspects of device performance and/or operation. For example, timers, counters, and/or other like circuits may be utilized, at least in part, by IoT-type device(s) 130 to determine measures of suitability, for example, and/or to otherwise generate feedback content related to testing results, in particular implementations. Because some IoT-type devices may be relatively resource-restrained, it may be advantageous to utilize relatively simple circuitry, such as timers and/or counters, for example, to track and/or otherwise measure various metrics related to device performance and/or operation.

Further, in particular implementations, server computing device(s) 110, for example, may track and/or otherwise obtain content representative of one or more aspects of one or more IoT-type devices 130. For example, server computing device(s) 110 may track and/or otherwise obtain content representative of an IoT-type device's geographical location, hardware and/or software specifications, environment, etc., to name but a few non-limiting examples. Such content may aid in future generation of proposed solutions and/or may help provide for more targeted deployment of proposed solutions, for example.

Although particular implementations and/or embodiments described herein may partition particular operations between server computing device(s) 110 and/or IoT-type device(s) 130 in a particular manner, claimed subject matter is not limited in scope in these respects. Also, although particular implementations and/or embodiments described herein may partition particular operations between active time and down time at IoT-type device(s) 130, claimed subject matter is not limited in scope in these respects.

In particular implementations, communications between IoT-type devices 130 and/or server computing device(s) 110 may comprise transmission of signals and/or signal packets between server computing device(s) 110 and IoT-type devices 130 and/or between IoT-type devices 130 and server computing device(s) 110. In particular implementations, communications between server computing devices 110 and/or IoT-type devices 130 may be secured, such as via encryption and/or other coding processes, for example.

Figure 8:
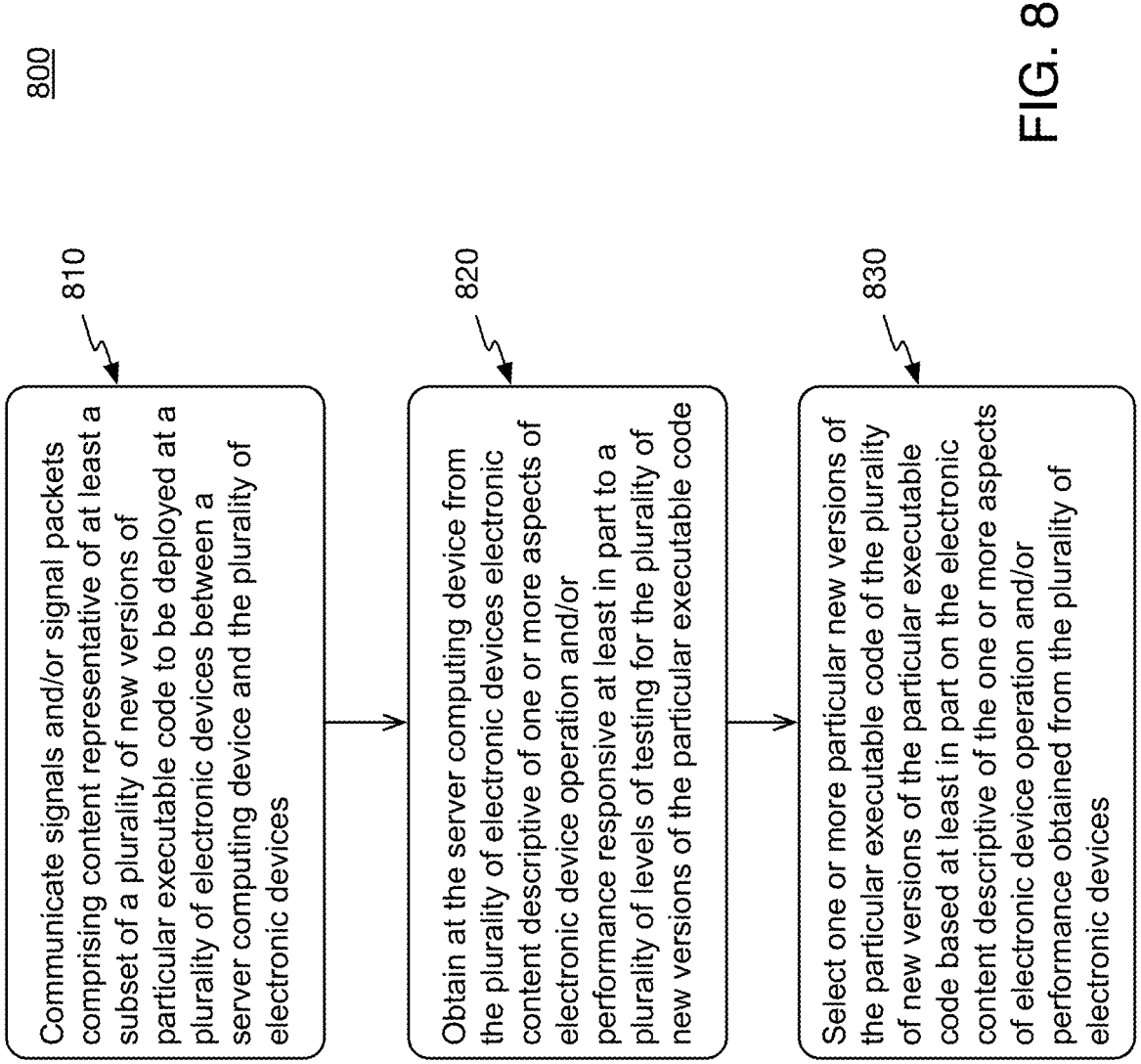
FIG. 8 is an illustration of an example flow diagram depicting an example process for improving software and/or firmware deployed at example electronic devices, in accordance with an embodiment.

FIG. 8 is an illustration of an example simplified flow diagram depicting an embodiment 800 of an example process for improving software and/or firmware deployed at example electronic devices. Embodiments in accordance with claimed subject matter may include all of blocks 810-830, fewer than blocks 810-830, and/or more than blocks 810-830. Likewise, it should be noted that content acquired or produced, such as, for example, input signals, output signals, operations, results, etc. associated with example embodiment 800 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As depicted at block 810, for example, an example process may include communicating signals and/or signal packets comprising content representative of at least a subset of a plurality of new versions of particular executable code to be deployed at a plurality of electronic devices, such as IoT-type devices 130, between a server computing device, such as server computing device(s) 110, and the plurality of electronic devices. Further, as depicted at block 820, an example process may further include obtaining at the server computing device from the plurality of electronic devices electronic content descriptive of one or more aspects of electronic device operation and/or performance responsive at least in part to a plurality of levels of testing for the plurality of new versions of the particular executable code, and may also include selecting one or more particular new versions of the particular executable code of the plurality of new versions of the particular executable code based at least in part on the electronic content descriptive of the one or more aspects of electronic device operation and/or performance obtained from the plurality of electronic devices, as depicted at block 830.

In particular implementations, the plurality of electronic devices may comprise Internet of Things devices, such as IoT-type devices 130, for example. Also, for particular implementations, obtaining the electronic content descriptive of electronic device operation and/or performance from the plurality of electronic devices may include obtaining a first portion of electronic content responsive to a first level of testing of the plurality of new versions of the particular executable code and further may include obtaining a second portion of electronic content responsive to a second level of testing of the plurality of new versions of the particular executable code. Further, particular implementations may include generating, via execution of an evolutionary and/or genetic process at the server computing device, the plurality of new versions of the particular executable code. In a particular implementation, communicating the signals and/or signal packets comprising the content representative of the plurality of new versions of the particular executable code between the server computing device and the plurality of electronic devices may include deploying particular new versions of the particular executable code to multiple electronic devices of the plurality of electronic devices.

Particular implementations may further comprise performing initial testing of the plurality of new versions of the particular executable code at the one or more server computing devices to determine which of the plurality of new versions of the particular executable code are to be deployed to the plurality of electronic devices. In particular implementations, the plurality of levels of testing may include shorter-term and longer-term testing of particular new versions of the particular executable code of the plurality of new versions of the particular executable code.

Particular implementations may also include generating a subsequent plurality of new versions of the particular executable code based at least in part on the electronic content descriptive of electronic device operation and/or performance obtained from the plurality of electronic devices. Further, particular implementations may include deploying the subsequent plurality of new versions of the particular executable code to a second plurality of electronic devices and obtaining at the one or more server computing devices from the second plurality of electronic devices electronic content descriptive of electronic device operation and/or performance responsive at least in part to an additional plurality of levels of testing for the subsequent plurality of new versions of the particular executable code.

Embodiments may include a server computing device, such as server computing device(s) 110, for example, to include a processor to initiate communication of signals and/or signal packets comprising content representative of at least a subset of a plurality of new versions of particular executable code to be deployed at a plurality of electronic devices between the server computing device and the plurality of electronic devices. An embodiment may further include a processor to obtain from the plurality of electronic devices, via a communication interface of the server computing device, electronic content descriptive of electronic device operation and/or performance responsive at least in part to a plurality of levels of testing for the plurality of new versions of the particular executable code. A processor may further select one or more particular new versions of the particular executable code of the plurality of new versions of the particular executable code based at least in part on the electronic content descriptive of the one or more aspects of electronic device operation and/or performance obtained from the plurality of electronic devices, for example.

In particular implementations, the plurality of electronic devices may comprise Internet of Things devices, such as IoT-type devices 130. Also, for particular implementations, to obtain the electronic content descriptive of electronic device operation and/or performance from the plurality of electronic devices, the processor may obtain a first portion of electronic content responsive to a first level of testing of the plurality of new versions of the particular executable code and further may obtain a second portion of electronic content responsive to a second level of testing of the plurality of new versions of the particular executable code. In particular implementations, the first level of testing may comprise shorter-term testing and the second level of testing may comprise longer-term testing.

In particular implementations, the processor may further generate, via execution of an evolutionary and/or genetic process, the plurality of new versions of the particular executable code. In particular implementations, communication of signals and/or signal packets to comprise content representative of the at least the subset of the plurality of new versions of the particular executable code may include deployment of particular new versions of the particular executable code of the plurality of new versions of the particular executable code to multiple particular electronic devices of the plurality of electronic devices.

Additionally, in particular implementations, the processor may further perform initial testing of the plurality of new versions of the particular executable code to determine which of the plurality of new versions of the particular executable code are to be deployed to the plurality of electronic devices. Further, in particular implementations, the plurality of levels of testing may include shorter-term and longer-term testing of particular new versions of the particular executable code of the plurality of new versions of the particular executable code, wherein the shorter-term testing may be performed at the plurality of electronic devices and wherein the longer-term testing may be performed at a subset of the plurality of electronic devices.

In particular implementations, the processor may further generate a subsequent plurality of new versions of the particular executable code based at least in part on the electronic content descriptive of electronic device operation and/or performance obtained from the plurality of electronic devices. Additionally, for particular implementations, the processor may further initiate deployment of the subsequent plurality of new versions of the particular executable code to a second plurality of electronic devices and obtain from the second plurality of electronic devices electronic content descriptive of electronic device operation and/or performance responsive at least in part to an additional plurality of levels of testing for the subsequent plurality of new versions of the particular executable code.

Figure 9:
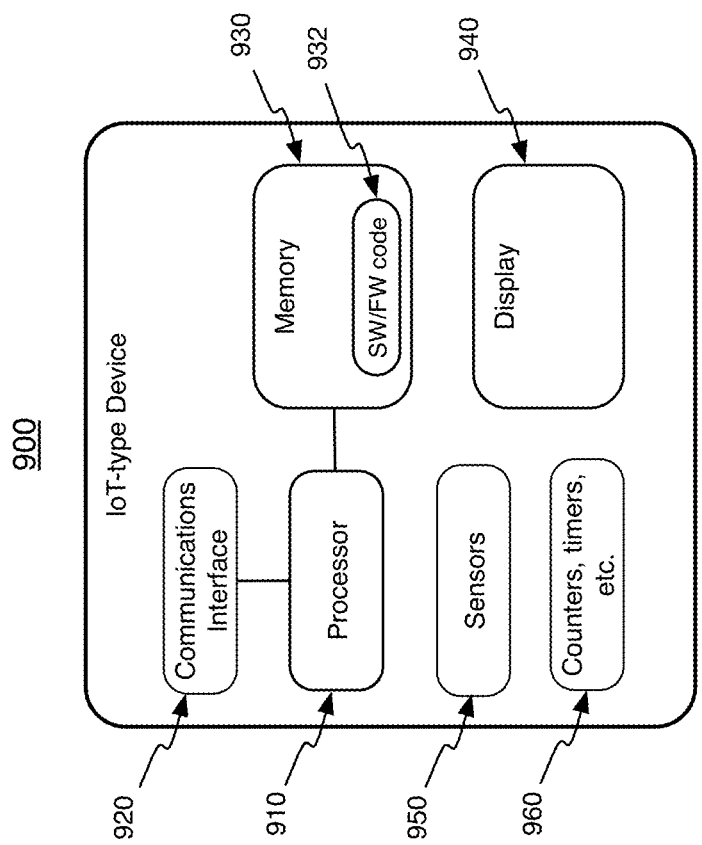
FIG. 9 is a schematic block diagram depicting an embodiment of an example Internet of Things (IoT) type device.

FIG. 9 is an illustration of an embodiment 900 of an example particular IoT device. Of course, claimed subject matter is not limited in scope to the particular configurations and/or arrangements of components depicted and/or described for example devices mentioned herein. In an embodiment, an IoT-type device, such as 900, may comprise one or more processors, such as processor 910, and/or may comprise one or more communications interfaces, such as communications interface 920. In an embodiment, one or more communications interfaces, such as communications interface 920, may enable wireless communications between an electronic device, such as an IoT-type device 900, and one or more other computing devices. In an embodiment, wireless communications may occur substantially in accordance any of a wide range of communication protocols, such as those mentioned herein, for example.

In a particular implementation, an IoT-type device, such as IoT-type device 900, may include a memory, such as memory 930. In a particular implementation, memory 930 may comprise a non-volatile memory, for example. Further, in a particular implementation, a memory, such as memory 930, may have stored therein executable instructions, such as for one or more operating systems, communications protocols, and/or applications, for example. A memory, such as 930, may further store particular instructions, such as software and/or firmware code 932, that may be updated via one or more example implementations and/or embodiments described herein. Further, in a particular implementation, an IoT-type device, such as IoT-type device 900, may comprise a display, such as display 940, and/or one or more sensors, such as one or more sensors 950. As utilized herein, "sensors" and/or the like refer to a device and/or component that may respond to physical stimulus, such as, for example, heat, light, sound pressure, magnetism, particular motions, etc., and/or that may generate one or more signals and/or states in response to physical stimulus. Example sensors may include, but are not limited to, one or more accelerometers, gyroscopes, thermometers, magnetometers, barometers, light sensors, proximity sensors, hear-rate monitors, perspiration sensors, hydration sensors, breath sensors, cameras, microphones, etc., and/or any combination thereof.

In particular implementations, IoT-type device 900 may operate in alternating periods of "active time" and/or "down time," as explained above in connection with example embodiment 700, for example. For a particular implementation, during a period of active time, processor 910 of IoT-type device 900 may execute a particular software and/or firmware agent as part of normal operation. During a subsequent period of down time, an update phase may occur wherein processor 910 may update a particular software and/or firmware agent, such as SW/FW code 932, for example, at least in part in accordance with a particular proposed solution obtained from a server computing device, such as server computing device(s) 110. Further, for example, processor 910 may perform shorter-term testing on updated SW/FW code 932. Processor 910 may also perform longer-term testing of updated SW/FW code 932 during periods of active time, for example. IoT-type device 900 may further transmit feedback related to testing operations to a server computing device, such as server computing device(s) 110, via communications interface 920, for example. In particular implementations, IoT-type device may be configured to perform example operations, in whole or in part, described above in connection with example embodiment 700, for example.

In particular implementations, IoT-type device 900 may include one or more timers and/or counters and/or like circuits, such as circuitry 960, for example. In an embodiment, one or more timers and/or counters and/or the like may track one or more aspects of device performance and/or operation. For example, timers, counters, and/or other like circuits may be utilized, at least in part, by IoT-type device 900 to determine measures of fitness, for example, and/or to otherwise generate feedback content related to testing results, in particular implementations.

Although FIG. 9 depicts a particular example implementation of an IoT-type device, such as IoT-type device 900, other embodiments may include other types of electronic and/or computing devices. Example types of electronic and/or computing devices may include, for example, any of a wide range of digital electronic devices, including, but not limited to, desktop and/or notebook computers, high-definition televisions, digital video players and/or recorders, game consoles, satellite television receivers, cellular telephones, tablet devices, wearable devices, personal digital assistants, mobile audio and/or video playback and/or recording devices, or any combination of the foregoing.

Figure 10:
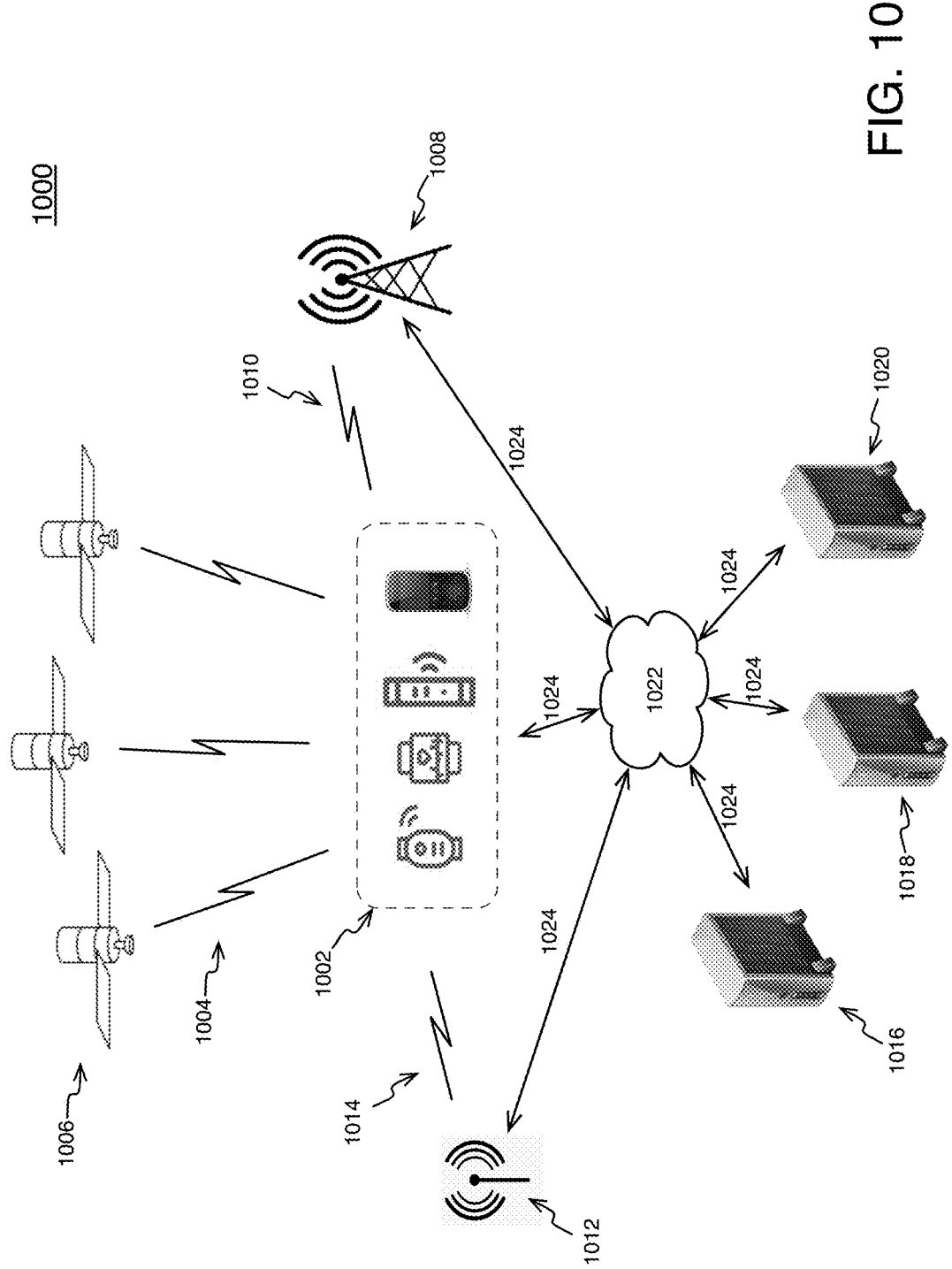
FIG. 10 is a schematic block diagram depicting an embodiment of an example system including one or more server computing devices and/or one or more IoT-type devices.

FIG. 10 is a schematic diagram illustrating features associated with an implementation of an example operating environment 1000 capable of facilitating and/or supporting one or more operations and/or techniques for infrastructure for updating and/or managing IoT-type devices, illustrated generally herein at 1002. As was indicated, the IoT is typically a system of interconnected and/or internetworked physical devices in which computing may be embedded into hardware so as to facilitate and/or support devices' abilities to acquire, collect and/or communicate content over one or more communications networks, for example, at times, without human participation and/or interaction. As mentioned, IoT-type devices may include a wide variety of stationary and/or mobile devices, such as, for example, automobile sensors, biochip transponders, heart monitoring implants, kitchen appliances, locks or like fastening devices, solar panel arrays, home gateways, smart gauges, smart telephones, cellular telephones, security cameras, wearable devices, thermostats, Global Positioning System (GPS)

transceivers, personal digital assistants (PDAs), virtual assistants, laptop computers, personal entertainment systems, tablet personal computers (PCs), PCs, personal audio and/or video devices, personal navigation devices, and/or the like.

It should be appreciated that operating environment 1000 is described herein as a non-limiting example that may be implemented, in whole or in part, in a context of various wired and/or wireless communications networks and/or any suitable portion and/or combination of such networks. For example, these or like networks may include one or more public networks (e.g., the Internet, the World Wide Web), private networks (e.g., intranets), wireless wide area networks (WWAN), wireless local area networks (WLAN, etc.), wireless personal area networks (WPAN), telephone networks, cable television networks, Internet access networks, fiber-optic communication networks, waveguide communication networks and/or the like. It should also be noted that claimed subject matter is not limited to a particular network and/or operating environment. Thus, for a particular implementation, one or more operations and/or techniques for updating and/or managing IoT-type devices may be performed, at least in part, in an indoor environment and/or an outdoor environment, or any combination thereof.

Thus, as illustrated, in a particular implementation, one or more IoT-type devices 1002 may, for example, receive and/or acquire satellite positioning system (SPS) signals 1004 from SPS satellites 1006. In some instances, SPS satellites 1006 may be from a single global navigation satellite system (GNSS), such as the GPS or Galileo satellite systems, for example. In other instances, SPS satellites 1006 may be from multiple GNSS such as, but not limited to, GPS, Galileo, Glonass, or Beidou (Compass) satellite systems, for example. In certain implementations, SPS satellites 1006 may be from any one several regional navigation satellite systems (RNSS) such as, for example, WAAS, EGNOS, QZSS, just to name a few examples.

At times, one or more IoT-type devices 1002 may, for example, transmit wireless signals to and/or receive wireless signals from a suitable wireless communication network. In one example, one or more IoT-type devices 1002 may communicate with a cellular communication network, such as by transmitting wireless signals to and/or receiving wireless signals from one or more wireless transmitters capable of transmitting and/or receiving wireless signals, such as a base station transceiver 1008 over a wireless communication link 1010, for example. Similarly, one or more IoT-type devices 1002 may transmit wireless signals to and/or receive wireless signals from a local transceiver 1012 over a wireless communication link 1014, for example. Base station transceiver 1008, local transceiver 1012, etc. may be of the same or similar type, for example, and/or may represent different types of devices, such as access points, radio beacons, cellular base stations, femtocells, an access transceiver device, or the like, depending on an implementation. Similarly, local transceiver 1012 may comprise, for example, a wireless transmitter and/or receiver capable of transmitting and/or receiving wireless signals. For example, at times, wireless transceiver 1012 may be capable of transmitting and/or receiving wireless signals from one or more other terrestrial transmitters and/or receivers.

In a particular implementation, local transceiver 1012 may, for example, be capable of communicating with one or more IoT-type devices 1002 at a shorter range over wireless communication link 1014 than at a range established via base station transceiver 1008 over wireless communication link 1010. For example, local transceiver 1012 may be positioned in an indoor or like environment and/or may provide access to a wireless local area network (WLAN, e.g., IEEE Std. 802.11 network, etc.) and/or wireless personal area network (WPAN, e.g., Bluetooth® network, etc.). In another example implementation, local transceiver 1012 may comprise a femtocell and/or picocell capable of facilitating communication via link 1014 according to an applicable cellular or like wireless communication protocol. Again, it should be understood that these are merely examples of networks that may communicate with one or more IoT-type devices 1002 over a wireless link, and claimed subject matter is not limited in this respect. For example, in some instances, operating environment 1000 may include a larger number of base station transceivers 1008, local transceivers 1012, networks, terrestrial transmitters and/or receivers, etc.

In an implementation, one or more IoT-type devices 1002, base station transceiver 1008, local transceiver 1012, etc. may, for example, communicate with one or more servers, referenced herein at 1016, 1018, and 1020, over a network 1022, such as via one or more communication links 1024. Network 1022 may comprise, for example, any combination of wired and/or wireless communication links. In a particular implementation, network 1022 may comprise, for example, Internet Protocol (IP)-type infrastructure capable of facilitating or supporting communication between one or more IoT-type devices 1002 and one or more servers 1016, 1018, 1020, etc. via local transceiver 1012, base station transceiver 1008, directly, etc. In another implementation, network 1022 may comprise, for example cellular communication network infrastructure, such as a base station controller and/or master switching center to facilitate and/or support mobile cellular communication with one or more IoT-type devices 1002. Servers 1016, 1018 and/or 1020 may comprise any suitable servers or combination thereof capable of facilitating or supporting one or more operations and/or techniques discussed herein. For example, servers 1016, 1018 and/or 1020 may comprise one or more update servers, back-end servers, management servers, archive servers, location servers, positioning assistance servers, navigation servers, map servers, crowdsourcing servers, network-related servers, or the like.

Even though a certain number of computing platforms and/or devices are illustrated herein, any number of suitable computing platforms and/or devices may be implemented to facilitate and/or support one or more techniques and/or processes associated with operating environment 1000. For example, at times, network 1022 may be coupled to one or more wired and/or wireless communication networks (e.g., WLAN, etc.) so as to enhance a coverage area for communications with one or more IoT-type devices 1002, one or more base station transceivers 1008, local transceiver 1012, servers 1016, 1018, 1020, or the like. In some instances, network 1022 may facilitate and/or support femtocell-based operative regions of coverage, for example. Again, these are merely example implementations, and claimed subject matter is not limited in this regard.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 11:
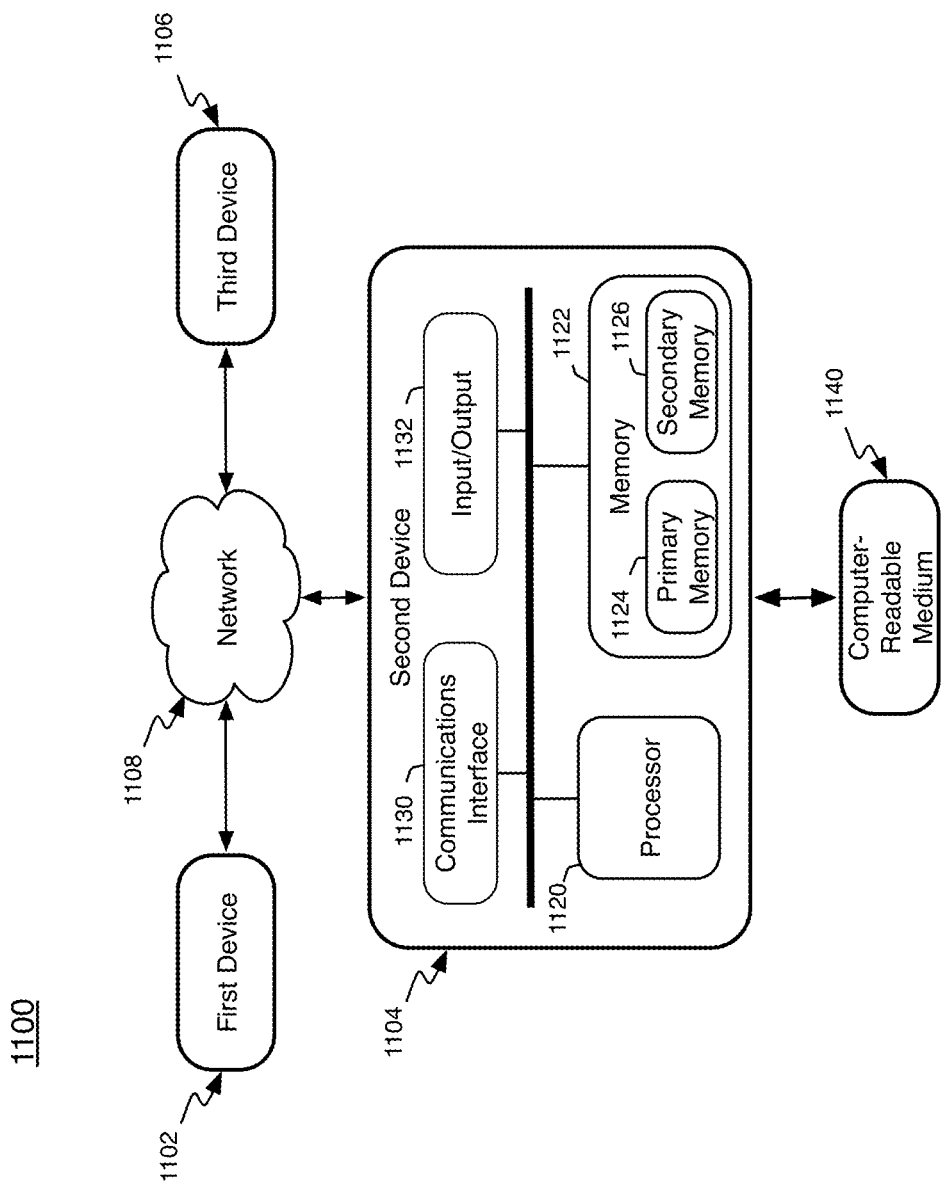
FIG. 11 is a schematic block diagram illustrating an embodiment of an example computing device.

In one example embodiment, as shown in FIG. 11, a system embodiment may comprise a local network (e.g., device 1104 and medium 1140) and/or another type of network, such as a computing and/or communications network. For purposes of illustration, therefore, FIG. 11 shows an embodiment 1100 of a system that may be employed to implement either type or both types of networks. Network 1108 may comprise one or more network connections, links, processes, services, applications, and/or resources to facilitate and/or support communications, such as an exchange of communication signals, for example, between a computing device, such as 1102, and another computing device, such as 1106, which may, for example, comprise one or more client computing devices and/or one or more server computing device. By way of example, but not limitation, network 1108 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 11 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-10 and in the text associated at least with the foregoing figure(s) of the present patent application.

Referring now to FIG. 11, in an embodiment, first and third devices 1102 and 1106 may be capable of rendering a graphical user interface (GUI) for a network device and/or a computing device, for example, so that a user-operator may engage in system use. Device 1104 may potentially serve a similar function in this illustration. Likewise, in FIG. 11, computing device 1102 ('first device' in figure) may interface with computing device 1104 ('second device' in figure), which may, for example, also comprise features of a client computing device and/or a server computing device, in an embodiment. Processor (e.g., processing device) 1120 and memory 1122, which may comprise primary memory 1124 and secondary memory 1126, may communicate by way of a communication bus 1115, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states.

Thus, a computing device, in the context of the present patent application, may comprise hardware, software, firmware, or any combination thereof (other than software per se). Computing device 1104, as depicted in FIG. 11, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 11, computing device 1102 may provide one or more sources of executable computer instructions in the form physical states and/or signals (e.g., stored in memory states), for example. Computing device 1102 may communicate with computing device 1104 by way of a network connection, such as via network 1108, for example. As previously mentioned, a connection, while physical, may not necessarily be tangible. Although computing device 1104 of FIG. 11 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1122 may comprise any non-transitory storage mechanism. Memory 1122 may comprise, for example, primary memory 1124 and secondary memory 1126, additional memory circuits, mechanisms, or combinations thereof may be used. Memory 1122 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1122 may be utilized to store a program of executable computer instructions. For example, processor 1120 may fetch executable instructions from memory and proceed to execute the fetched instructions. Memory 1122 may also comprise a memory controller for accessing device readable-medium 1140 that may carry and/or make accessible digital content, which may include code, and/or instructions, for example, executable by processor 1120 and/or some other device, such as a controller, as one example, capable of executing computer instructions, for example. Under direction of processor 1120, a non-transitory memory, such as memory cells storing physical states (e.g., memory states), comprising, for example, a program of executable computer instructions, may be executed by processor 1120 and able to generate signals to be communicated via a network, for example, as previously described. Generated signals may also be stored in memory, also previously suggested.

Memory 1122 may store electronic files and/or electronic documents, such as relating to one or more users, and may also comprise a computer-readable medium that may carry and/or make accessible content, including code and/or instructions, for example, executable by processor 1120 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1120 may comprise one or more circuits, such as digital circuits, to perform at least a portion of a computing procedure and/or process. By way of example, but not limitation, processor 1120 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1120 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 11 also illustrates device 1104 as including a component 1132 operable with input/output devices, for example, so that signals and/or states may be appropriately communicated between devices, such as device 1104 and an input device and/or device 1104 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
    communicating signals and/or signal packets comprising content representative of at least a subset of a plurality of new versions of particular executable code to be deployed at a plurality of electronic devices between a server computing device and the plurality of electronic devices;
    obtaining at the server computing device from the plurality of electronic devices electronic content descriptive of one or more aspects of electronic device operation and/or performance responsive at least in part to a plurality of levels of testing for the plurality of new versions of the particular executable code; and
    selecting one or more particular new versions of the particular executable code of the plurality of new versions of the particular executable code based at least in part on the electronic content descriptive of the one or more aspects of electronic device operation and/or performance obtained from the plurality of electronic devices.

2. The method of claim 1, wherein the plurality of electronic devices comprise Internet of Things (IoT)-type devices.

3. The method of claim 1, wherein the obtaining the electronic content descriptive of electronic device operation and/or performance from the plurality of electronic devices includes obtaining a first portion of electronic content responsive to a first level of testing of the plurality of new versions of the particular executable code and further includes obtaining a second portion of electronic content responsive to a second level of testing of the plurality of new versions of the particular executable code.

4. The method of claim 1, further comprising generating, via execution of an evolutionary and/or genetic process at the server computing device, the plurality of new versions of the particular executable code.

5. The method of claim 4, wherein the communicating the signals and/or signal packets comprising the content representative of the plurality of new versions of the particular executable code between the server computing device and the plurality of electronic devices includes deploying particular new versions of the particular executable code to multiple electronic devices of the plurality of electronic devices.

6. The method of claim 1, further comprising performing initial testing of the plurality of new versions of the particular executable code at the server computing device to determine which of the plurality of new versions of the particular executable code are to be deployed to the plurality of electronic devices.

7. The method of claim 1, wherein the plurality of levels of testing include shorter-term and longer-term testing of particular proposed solutions of the plurality of new versions of the particular executable code.

8. The method of claim 1, further comprising generating a subsequent plurality of new versions of the particular executable code based at least in part on the electronic content descriptive of electronic device operation and/or performance obtained from the plurality of electronic devices.

9. The method of claim 8, further comprising:
deploying the subsequent plurality of new versions of the particular executable code to a second plurality of electronic devices; and
obtaining at the server computing device from the second plurality of electronic devices electronic content descriptive of electronic device operation and/or performance responsive at least in part to an additional plurality of levels of testing for the subsequent plurality of new versions of the particular executable code.

10. An apparatus, comprising: a server computing device to include:
a processor to initiate communication of signals and/or signal packets comprising content representative of at least a subset of a plurality of new versions of particular executable code to be deployed at a plurality of electronic devices between the server computing device and the plurality of electronic devices;
wherein the processor further to obtain from the plurality of electronic devices, via a communication interface of the server computing device, electronic content descriptive of electronic device operation and/or performance responsive at least in part to a plurality of levels of testing for the plurality of new versions of the particular executable code; and
wherein the processor further to select one or more particular new versions of the particular executable code of the plurality of new versions of the particular executable code based at least in part on the electronic content descriptive of the one or more aspects of electronic device operation and/or performance obtained from the plurality of electronic devices.

11. The apparatus of claim 10, wherein the plurality of electronic devices to comprise Internet of Things (IoT)-type devices.

12. The apparatus of claim 10, wherein to obtain the electronic content descriptive of electronic device operation and/or performance from the plurality of electronic devices, the processor to obtain a first portion of electronic content responsive to a first level of testing of the plurality of new versions of the particular executable code and further to obtain a second portion of electronic content responsive to a second level of testing of the plurality of new versions of the particular executable code.

13. The apparatus of claim 12, wherein the first level of testing to comprise shorter-term testing and wherein the second level of testing to comprise longer-term testing.

14. The apparatus of claim 10, wherein the processor further to generate, via execution of an evolutionary and/or genetic process, the plurality of new versions of the particular executable code.

15. The apparatus of claim 10, wherein, to initiate communication of the signals and/or signal packets to comprise content representative of the at least the subset of the plurality of new versions of the particular executable code, the processor to initiate deployment of particular new versions of the particular executable code of the plurality of new versions of the particular executable code to multiple particular electronic devices of the plurality of electronic devices.

16. The apparatus of claim 10, wherein the processor further to perform initial testing of the plurality of new versions of the particular executable code to determine which of the plurality of new versions of the particular executable code are to be deployed to the plurality of electronic devices.

17. The apparatus of claim 10, wherein the plurality of levels of testing to include shorter-term and longer-term testing of particular new versions of the particular executable code of the plurality of new versions of the particular executable code, wherein the shorter-term testing to be performed at the plurality of electronic devices and wherein the longer-term testing to be performed at a subset of the plurality of electronic devices.

18. The apparatus of claim 10, wherein the processor further to generate a subsequent plurality of new versions of the particular executable code based at least in part on the electronic content descriptive of electronic device operation and/or performance obtained from the plurality of electronic devices.

19. The apparatus of claim 18, wherein the processor further to:
initiate deployment of the subsequent plurality of new versions of the particular executable code to a second plurality of electronic devices; and
obtain from the second plurality of electronic devices electronic content descriptive of electronic device operation and/or performance responsive at least in part to an additional plurality of levels of testing for the subsequent plurality of new versions of the particular executable code.

20. An article, comprising: a storage medium having stored thereon instructions executable by a computing device to:
initiate communication of signals and/or signal packets comprising content representative of at least a subset of a plurality of new versions of particular executable code to be deployed at a plurality of electronic devices between the computing device and the plurality of electronic devices;
obtain from the plurality of electronic devices electronic content descriptive of electronic device operation and/ or performance responsive at least in part to a plurality of levels of testing for the plurality of new versions of the particular executable code; and select one or more particular new versions of the particular executable code of the plurality of new versions of the particular executable code based at least in part on the electronic content descriptive of the one or more aspects of electronic device operation and/or performance obtained from the plurality of electronic devices.

* * * * *